United States Patent
Fang et al.

(10) Patent No.: US 11,967,086 B2
(45) Date of Patent: Apr. 23, 2024

(54) PLAYER TRAJECTORY GENERATION VIA MULTIPLE CAMERA PLAYER TRACKING

(71) Applicant: Intel Corporation, Santa Clara, CA (US)

(72) Inventors: Yikai Fang, Beijing (CN); Qiang Li, Beijing (CN); Wenlong Li, Beijing (CN); Chenning Liu, Beijing (CN); Chen Ling, Beijing (CN); Hongzhi Tao, Beijing (CN); Yumeng Wang, Beijing (CN); Hang Zheng, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 267 days.

(21) Appl. No.: 17/435,923

(22) PCT Filed: Jul. 31, 2019

(86) PCT No.: PCT/CN2019/098508
§ 371 (c)(1),
(2) Date: Sep. 2, 2021

(87) PCT Pub. No.: WO2021/016901
PCT Pub. Date: Feb. 4, 2021

(65) Prior Publication Data
US 2022/0198684 A1    Jun. 23, 2022

(51) Int. Cl.
*G06T 7/292*    (2017.01)
*A63F 13/213*    (2014.01)
(Continued)

(52) U.S. Cl.
CPC .......... *G06T 7/246* (2017.01); *A63F 13/213* (2014.09); *A63F 13/42* (2014.09); *A63F 13/65* (2014.09);
(Continued)

(58) Field of Classification Search
CPC .......... G06T 7/246; G06T 7/292; G06T 7/70; G06T 15/20; G06T 2207/20084;
(Continued)

(56) References Cited

U.S. PATENT DOCUMENTS

| 8,477,995 B2 * | 7/2013 | Porter | H04N 13/122 |
| | | | 382/103 |
| 9,094,615 B2 * | 7/2015 | Aman | G06T 19/006 |

(Continued)

FOREIGN PATENT DOCUMENTS

| CN | 105631399 | 6/2016 |
| CN | 107871120 | 4/2018 |
| CN | 109903312 | 6/2019 |

OTHER PUBLICATIONS

International Searching Authority, "International Search Report," issued in connection with PCT Application No. PCT/CN2019/098508, dated Apr. 24, 2020, 3 pages.
(Continued)

*Primary Examiner* — Vijay Shankar
(74) *Attorney, Agent, or Firm* — Hanley, Flight & Zimmerman, LLC

(57) ABSTRACT

A method for trajectory generation based on player tracking is described herein. The method includes determining a temporal association for a first player in a captured field of view and determining a spatial association for the first player. The method also includes deriving a global player identification based on the temporal association and the spatial association and generating a trajectory based on the global player identification.

25 Claims, 15 Drawing Sheets

(51) Int. Cl.
  *A63F 13/42* (2014.01)
  *A63F 13/65* (2014.01)
  *G06T 7/246* (2017.01)
  *G06T 7/70* (2017.01)
  *G06T 15/20* (2011.01)
  *G06V 10/82* (2022.01)
  *G06V 20/40* (2022.01)
  *G06V 40/10* (2022.01)

(52) U.S. Cl.
  CPC ............... *G06T 7/292* (2017.01); *G06T 7/70* (2017.01); *G06T 15/20* (2013.01); *G06V 10/82* (2022.01); *G06V 20/42* (2022.01); *G06V 40/10* (2022.01); *A63F 2300/8082* (2013.01); *G06T 2207/20084* (2013.01); *G06T 2207/30221* (2013.01)

(58) Field of Classification Search
  CPC . G06T 2207/30221; G06T 2207/30241; G06T 2207/30196; G06T 2207/30228; A63F 13/213; A63F 13/42; A63F 13/65; A63F 2300/8082; G06V 10/82; G06V 20/42; G06V 40/10; G06F 18/24133
  See application file for complete search history.

(56) References Cited

U.S. PATENT DOCUMENTS

| | | | | |
|---|---|---|---|---|
| 10,140,575 | B2* | 11/2018 | Lucey | G06V 20/42 |
| 10,748,008 | B2* | 8/2020 | Chang | G11B 27/28 |
| 10,818,033 | B2* | 10/2020 | Dassa | G06N 3/08 |
| 2008/0192116 | A1 | 8/2008 | Tamir et al. | |
| 2010/0208942 | A1 | 8/2010 | Porter et al. | |
| 2016/0260015 | A1 | 9/2016 | Lucey et al. | |
| 2021/0256245 | A1* | 8/2021 | Li | G06V 20/64 |

OTHER PUBLICATIONS

International Searching Authority, "Written Opinion," issued in connection with PCT Application No. PCT/CN2019/098508, dated Apr. 24, 2020, 4 pages.
Ristani, "Features for Multi-Target Multi-Camera Tracking and Re-Identification," EEE/CVF Conference on Computer Vision and Pattern Recognition, 2018, 11 pages.
Mot Challenge, "DukeMTMC Results" 4 pages, retrieved from the Internet https://web.archive.org/web/20180720165408/https://plus.google.com/105162624056054412979.
Tracab, "Tracab Technologies" 8 pages, retrieved from the Internet https://tracab.com/products/tracab-technologies/tracab-optical/.
Second Spectrum, "The Next Way of Seeing Sports," 5 pages retrieved from the internet https://www.secondspectrum.com/.
Savitzky et al., "Smoothing and Differentiation of Data by Simplified Least Squares Procedures," Analytical Chemistry, vol. 36, No. 8, pp. 1627-1639, Jul. 1964, 13 pages.
Github, "schuar-iosb/mta-dataset," 12 pages, retrieved from the Internet https://github.com/schuar-iosb/mta-dataset.
European Patent Office, "European Search Report," issued in connection with European Patent Appl. No. 19939437, dated Mar. 28, 2023, 9 pages.
Konstantinos Rematas et al, "Soccer on Your Tabletop," arxiv.org, Cornell University Library, 201 Olin Library Cornell University Ithaca, Ny, 14853, Jun. 4, 2018, XP080886595, 10 pages.
Liu Jingchen et al., "Tracking Sports Players with Context-Conditioned Motion Models," 2017 IEEE Conference On Computer Vision And Pattern Recognition (CVPR), IEEE Computer Society, US, Jun. 23, 2013, pp. 1830-1837.
Kasuya N et al., "Automatic Player's View Generation of Real Soccer Scenes Based on Trajectory Tracking," 3DTV Conference; The True Vision-Capture, Transmission and Display of 3D Video, IEEE, Piscataway, NJ, USA, May 4, 2009, 4 pages.
Patent Cooperation Treaty, "International Preliminary Report on Patentability," issued in connection with International Appl. No. PCT/CN2019/098508, dated Feb. 1, 2022, 1 page.

* cited by examiner

206

208

US 11,967,086 B2

1

PLAYER TRAJECTORY GENERATION VIA MULTIPLE CAMERA PLAYER TRACKING

BACKGROUND

Multiple cameras are used to capture activity in a scene. Subsequent processing of the captured images enables end users to view the scene and move throughout the scene in over a full 360-degree range of motion. For example, multiple cameras may be used to capture a sports game and end users can move throughout the field of play freely. The end user may also view the game from a virtual camera.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2B; and so on.

DESCRIPTION OF THE EMBODIMENTS

Figure 1:
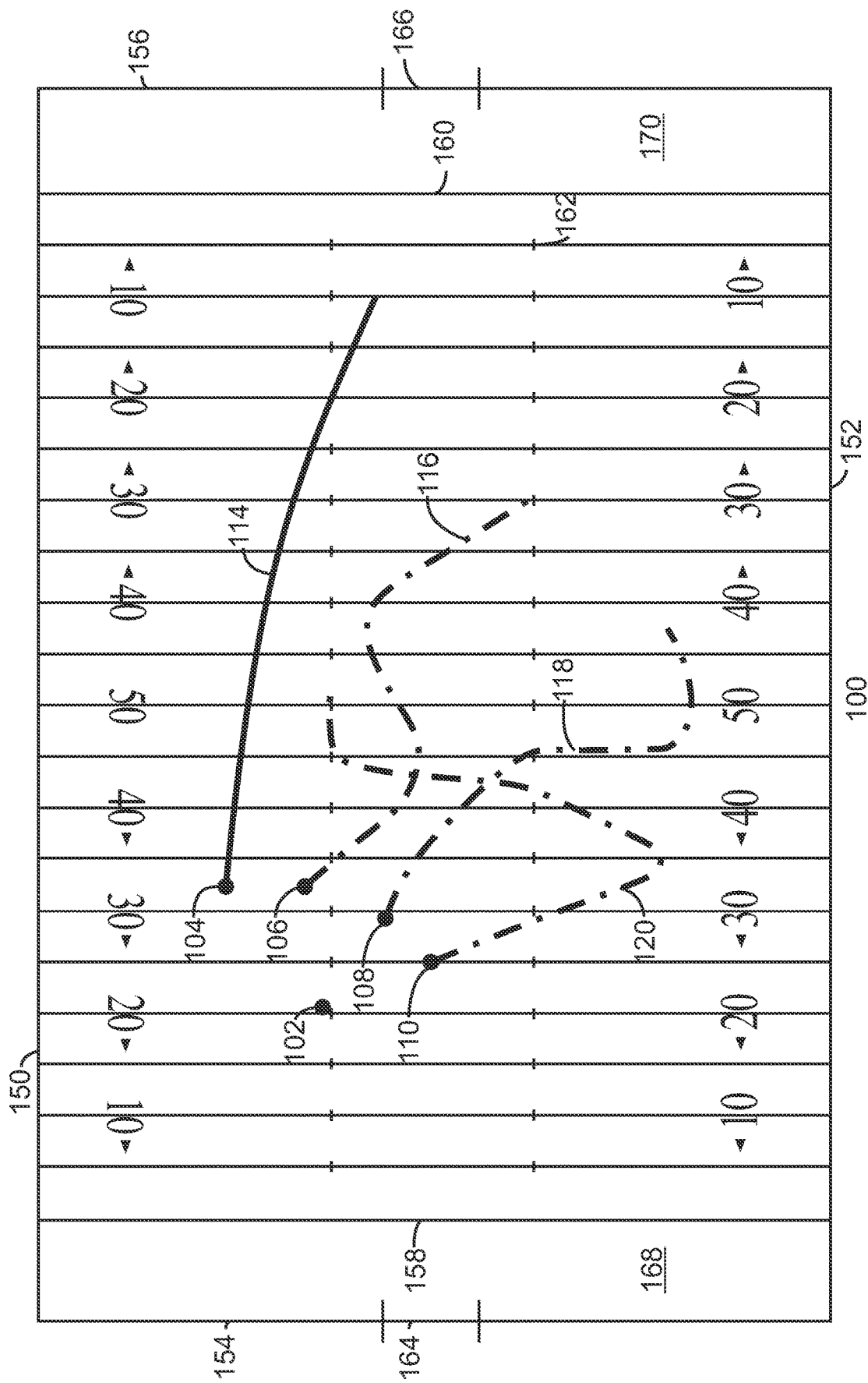
FIG. 1 is an illustration of a field of play.

Sporting events and other competitions are often broadcast for the entertainment of end users. These games may be rendered in a variety of formats. For example, a game can be rendered as a two-dimensional video or a three-dimensional video. The games may be captured using one or more high-resolution cameras positioned around an entire field of play. The plurality of cameras may capture an entire three-dimensional volumetric space, including the field of play. In embodiments, the camera system may include multiple super high-resolution cameras for volumetric capture. The end users can view the action of the game and move through the captured volume freely by being present with a sequence of images representing the three-dimensional volumetric space. Additionally, an end user can view the game from a virtual camera that follows the action within the field by following the ball or a specific player in the three-dimensional volumetric space.

The present techniques enable player trajectory generation via multiple camera player tracking. Providing an immersive experience may be based, in part, on automatically tracking the ball and players with high accuracy in real time. Moreover, the present techniques may automatically track the ball and detect highlight moments during gameplay in real time. In this manner, an immersive media experience is provided to end users in real-time.

As used herein, a game may refer to a form of play according to a set of rules. The game may be played for recreation, entertainment, or achievement. A competitive game may be referred to as a sport, sporting event, or competition. Accordingly, a sport may also be a form of competitive physical activity. The game may have an audience of spectators that observe the game. The spectators may be referred to as end-users when the spectators observe the game via an electronic device, as opposed to viewing the game live and in person. The game may be competitive in nature and organized such that opposing individuals or teams compete to win. A win refers to a first individual or first team being recognized as triumphing over other individuals or teams. A win may also result in an individual or team meeting or securing an achievement. Often, the game is played on a field, court, within an arena, or some other area designated for gameplay. The area designated for gameplay typically includes markings, goal posts, nets, and the like to facilitate gameplay.

A game may be organized as any number of individuals configured in an opposing fashion and competing to win. A team sport is a game where a plurality of individuals is organized into opposing teams. The individuals may be generally referred to as players. The opposing teams may compete to win. Often, the competition includes each player making a strategic movement to successfully overcome one or more players to meet a game objective. An example of a team sport is football.

Generally, football describes a family of games where a ball is kicked at various times to ultimately score a goal. Football may include, for example, association football, gridiron football, rugby football. American football may be a variation of gridiron football. In embodiments, the American football described herein may be as played according to the rules and regulations of the National Football League (NFL). While American football is described, the present techniques may apply to any event where an individual makes strategic movements within a defined space. In embodiments, a strategic movement may be referred to as a trajectory. An end user can be immersed in a rendering of the event based on this trajectory according to the techniques described herein. In particular, the present techniques enable trajectory generation with multiple cameras in sports video, which is based on the identification of all the players in the field of play at I frame, integrated with corresponding jersey and team information. Again, for ease of description, the present techniques are described using an American football game as an example. However, any game, sport, sporting event, or competition may be used according to the present techniques.

FIG. 1 is an illustration of a field of play 100. Generally, the "field of play" may be referred to as a field. On the field 100, a location of five players 102, 104, 106, 108, and 110 is represented by a dot. The player trajectories are based on the movement of the of five players 102, 104, 106, 108, and 110 on the field 100, and are represented by a trajectory 112, 114, 116, 118, and 120, respectively. In the football example of FIG. 1, a number of cameras may be used to capture the field 100. Multiple calibrated cameras may be deployed in a stadium to capture high-resolution images of the field 100. The images may be processed via segmentation and three-dimensional (3D) reconstruction to create 3D volumetric model. Segmentation includes the extraction of each player from a captured image. The present techniques enable a virtual camera to be placed in the 3D space and navigated within 3D space to follow a player or ball. In embodiments, the present techniques also enable a virtual camera to be placed in the 3D space and navigated freely within 3D space, thereby creating a new trajectory within the 3D space.

The operation of the virtual camera may depend on the positions of players or ball, which are typically the focus of the game. In embodiments, the player location and trajectory controls or dictates the virtual camera path movement. In the example of FIG. 1, the trajectories 112, 114, 116, 118, and 120 of the players 102, 104, 106, 108, and 110, provides paths along which a virtual camera may progress through the field of play. The ability to progress through the field of play enables an end user to "see" the same view as a player saw during real-time gameplay. The present techniques also enable game storytelling, assistant coaching, coaching, strategizing, player evaluation, and player analysis through the accurate location of players at all times during active gameplay.

Accurate player tracking and trajectory generation can be a very challenging task in team sports due to the heavy occlusion of players, large variation of player body shapes, and the generally similar appearance of players of the same team. Thus, the present techniques enable trajectory generation based on an identification of all the players in a field of play, at any frame from any camera using only the data captured by that particular camera, integrated with the corresponding jersey and team information. In particular, the present techniques connect this temporal association of a player with spatial associations of the player, and further integrates the jersey number of the player and team tag data of the player to generate trajectories for the player in the field of play. In embodiments, trajectory generation is executed for every player in the field of play. The trajectory generation may also include instances where the player leaves the field of play during a game, as well as when the player returns to the field of player during a game.

As illustrated in the example of FIG. 1, the field of play 100 may be an American football field. An American football field is rectangular in shape with a length of 120 yards and a width of 53⅓ yards. Lines 150 and 152 along the perimeter of the field of play 100 may be referred to as sidelines. Lines 154 and 156 along the perimeter of the field of play 100 may be referred to as end lines. The goal lines 158 and 160 are located 10 yards from the end lines 154 and 156, respectively. The yard lines are marked every 5 yards from one goal line 158 to the other goal line 160. Hash marks 162 may be short parallel lines that occur in one-yard increments between each yard line. Goalposts 164 and 166 may be located at the center of each end line 154 and 156. Additionally, the field of play may be adorned with logos and other emblems that represent the team that owns the field.

The field of play 100 includes end zones 168 and 170 at each end of the field of play. During play, a first team is designated as the offense, and a second team is designated as the defense. The ball used during play is an oval or prolate spheroid. The offense controls the ball, while the defense is without control of the ball. The offense attempts to advance the ball down the length of the rectangular field by running or passing the ball while the defense simultaneously attempts to prevent the offense from advancing the ball down the length of the field. The defense may also attempt to take control of the ball. Generally, to begin a round of play opposing teams line up in a particular format. A round of play may be referred to as a down. During each down, the offense is given an opportunity to execute a play to advance down the field. To begin a play, the offense and defense line up along a line of scrimmage according to various schemes. For example, an offense will line up in a formation in an attempt to overcome the defense and advance the ball toward the goal line 158/160. If the offense can advance the ball past the goal line 158/160 and into the end zone 168/170, the offense will score a touchdown and is awarded points. The offense is also given a try to obtain points after the touchdown.

An American football game is about four hours in duration including all breaks where no gameplay occurs. In some cases, about half of the four hours includes active gameplay, while the other half is some sort of break. As used herein, a break may refer to team timeouts, official timeouts, commercial timeouts, halftime, time during transition after a turnover, and the like. The game may begin with a kickoff, where the kicking team kicks the ball to the receiving team. During the kickoff, the team who will be considered the offense after the kickoff is the receiving team, while the kicking team is typically considered the defense. After the kickoff, the offense must advance the ball at least ten yards downfield in four downs, or otherwise the offense turns the football over to the defense. If the offense succeeds in advancing the ball ten yards or more, a new set of four downs is given to the offense to use in advancing the ball another ten yards. Generally, points are given to the team that advances the ball into the opposing team's end zone or kicks the ball through the goal posts of the opposing team. The team with the most points at the end of a game wins. There are also a number of special plays that may be executed during a down, including but not limited to, punts, field goals, and extra point attempts.

The present techniques provide tracking of all players during a game or an event. The diagram of FIG. 1 is not intended to indicate that the example field 100 is to include all of the players or field markings shown in FIG. 1. Rather, the example field can be implemented using fewer or additional players and markings not illustrated in FIG. 1. For example, during active gameplay in American football, each team may have up to eleven players on the field. Players may be freely substituted between downs. Moreover, the present techniques are not limited to the gameplay described above. In some instances, the rules of gameplay may be modified, resulting in a modification of when players are detected and tracked. Additionally, the present techniques enable optical solutions to track each player, including when players are substituted between downs or other breaks in gameplay-.

Figure 2:
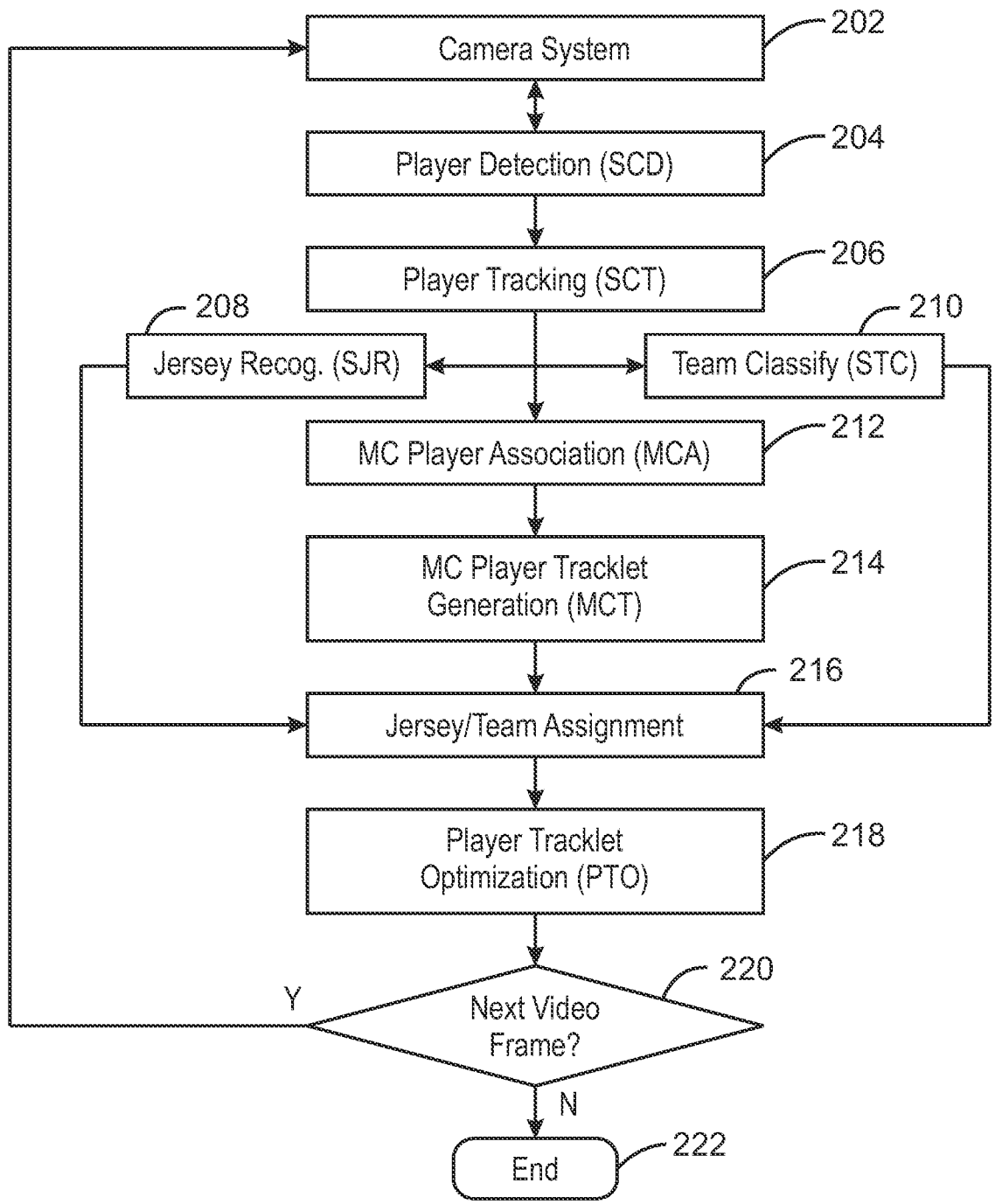
FIG. 2 is a system that enables multiple camera player tracking.

FIG. 2 is a system 200 that enables multiple camera player tracking. In embodiments, the multiple-camera based player tracking process decouples the identity of a player from the location of a player. In particular, player tracking is executed via a location-based tracking module that include a player detection (SCD) module 204 and player tracking (SCT) module 206 in each camera view, respectively. The location-based tracking results are input into identification modules, such as the player jersey number recognition (SJR) module and a team classification (STC) module to recognize jersey number and team information for each player, respectively. The player tracking in single camera also links the jersey number and team information temporally. In multi-view process, a multiple-camera player association algorithm is executed at frame-level to associate players from each camera and compute a 3D position for each player using projection matrices. In examples, a projection matrix is camera parameter. The projection matrix enables the use of image coordinates from multiple cameras to generate corresponding three-dimensional locations. The projection matrix maps the two-dimensional coordinates of a player in from multiple cameras at timestamp t to a three-dimensional location within the three-dimensional volumetric space.

After that, the multiple-camera association (MCA) module 212 and single camera player (SCT) module 206 tracking results will be input into a player tracklet generation (MCT) module 214 to generate a global player identification. The jersey number and team information from multiple views will be tagged to each player tracklet by a jersey/team assignment module 216. Finally, a player tracklet optimization (PTO) module 218 is executed to refine and optimize the tracklets, and to also generate a long trajectory for each player.

Thus, the system 200 includes a number of modules that enable an immersive viewing experience for an end user. In embodiments, based on the player trajectory, an immersive media experience may be provided. In some cases, the immersive media experience is provided in real-time. Alternatively, the immersive media experience may be a replay of a previously captured game. In the immersive media experience, an end user can follow the ball and players over a full 360-degree freedom of movement within the field of play. In embodiments, the present techniques enable a virtual camera that follows the player to generate volumetric video from the perspective of the player within the captured three-dimensional volumetric space.

The system 200 includes a plurality of cameras in a camera system 202. In embodiments, the camera system may include one or more physical cameras with 5120×3072 resolution, configured throughout a stadium to capture the field of play. For example, the number of cameras in the camera system may be thirty-eight. A subset of cameras may be selected, such as eighteen cameras from among the thirty-eight cameras, to cover the entire field of play and ensure that each pixel in the field of play is captured by at least three cameras. The camera system 202 captures a real-time video stream from a plurality of cameras. The plurality of cameras may capture the field of play at 30 frames per second (fps). The subset of cameras selected may be different in different scenarios. For example, depending on the structure surrounding the field of play, each location may be captured by at least three cameras using a varying number of cameras.

As used herein, some modules take as input image data from a single camera, and derive a player location, trajectory, identification, team tag or other information based on information from the single camera. Other modules take as input image data from multiple cameras, and derive a player location, trajectory, identification, team tag or other information based on information from multiple cameras. In the example of FIG. 2, modules 204, 206, 2008, and 210 may take as input information from a single camera, and derive results according to information from the single camera or single camera view. The modules 212, 214, 216, 218, and 220 may take as input information from all cameras to derive In embodiments, the single camera player detection (SCD) module 204 is executed to determine isolated bounding boxes that define the location of each player in a single camera view captured by the camera system 202. The single camera player tracking (SCT) module 206 obtains an association of the bounding boxes of an identical player across frames captured by a single camera, and assigns each player a unique track ID across the frames captured by the single camera. The single camera player jersey number recognition (SJR) module 208 and the single camera player team classification (STC) module 210 takes as input the bounding boxes of players from the SCT module 206 derives the jersey number and team tag of a player. The multiple camera association (MCA) module 212 uses the bounding boxes of a player at a timestamp t from multiple cameras to derive a location of the player in the field of play. The location may be a two-dimensional or a three-dimensional location in the captured volumetric space. In particular, the MCA module 212 associates bounding boxes in multiple camera views of an identical player by linking the player's various unique track IDs from each camera of the camera system.

Accordingly, the present techniques derive two kinds of association. The first association is that for a temporal domain, across frames as captured by a single camera. The second association is that for a spatial domain, across multiple cameras. In embodiments, the SCT module 206 derives the temporal association from the input images, while MCA module 212 derives the spatial association from the input images. A multiple camera tracking (MCT) module 214 derives correspondences and connects the temporal and spatial associations to determine a global player identification (ID) of each player in the field of play. Based on the global player ID, a final jersey/team assignment 216 module is executed.

A player trajectory optimization (PTO) module 218 takes as input the jersey/team information and locations and generates player trajectories. In embodiments, the player trajectories as used to enable the operations of virtual cameras throughout the captured field of view. Thus, the MCT 214, with input data from SCT 206, MCA 212, SJR 208 and STC 210, determines a consistent global player ID with assigned jersey number/team tag in order to generate short tracklets of a player. The global player ID associates a player's temporal and spatial data across a plurality of frames at the same point in time from multiple cameras. The present techniques connect a temporal association (SCT) with a spatial association (MCA) and then integrates jersey number and team tag data from the SJR module 208 and the STC module 210 to generate trajectories for all players in the field of play. As used herein, a tracklet is defined as portion of the complete trajectory of a player. The complete trajectory may be the entire movement of the player during a particular play or within a designated time frame. In some cases, the tracklet may also include a portion of a trajectory as generated according to any ball detection algorithm as described herein. In embodiments, a tracklet that occurs during a generally ball detection algorithm, where the ball is visible for a certain period of time, may be referred to as a major tracklet.

In embodiments, at the MCT 214, two additional processes occur: multiple track ID association and team/jersey assignment. Multiple track ID association identifies the players between frames and camera views for a short time range (for example, 30 frames). Additionally, the present solution can optimize the trajectories via the PTO module 218. To generate a continuous and stable trajectory, cumulative voting on the jersey number and team information may be used to connect tracklets as generated by the MCT module 214 and eliminate outliers by the motion constraints.

Finally, a global smoothing mechanism is applied at the PTO module 218 to all trajectories to reduce jittering.

At decision block 220, it is determined if there is an additional frame to process. If there is an additional frame to process, process flow returns to block 202 to obtain an additional captured frame for processing. If there are no additional frames to process, process flow continues to block 222 where the process ends. In this manner, the video captured by the camera system 202 can be processed to derive player trajectories and location. The trajectories derived in FIG. 2 may be further processed by additional immersive viewing modules to immerse an end user in the three-dimensional scene captured by the camera system 202.

In in particular, as a result of the processing as illustrated in the example of FIG. 2, an end user is able to view gameplay from any point within the field of play. The end user is also able to view a full 360° of the game at any point within the field of play. Thus, in embodiments and end user may experience gameplay from the perspective of any player. The game may be captured via a volumetric capture method, with footage captured by thirty-eight 5K ultra-high-definition cameras that capture height, width and depth data to produce voxels (pixels with volume). Thus, a camera system according to the present techniques may include multiple super-high-resolution cameras to capture the entire playing field. After the game content is captured, a substantial amount of data is processed, where all the viewpoints of a fully volumetric three-dimensional person or object are recreated. This information may be used to render a virtual environment in a multi-perspective three-dimensional format that enables users to experience a captured scene from any angle and perspective and can provide true six degrees of freedom.

The diagram of FIG. 2 is not intended to indicate that the example system is to include all of the systems and modules shown in FIG. 2. Rather, the example system 200 can be implemented using fewer or additional camera systems and modules not illustrated in FIG. 2.

Figure 3:
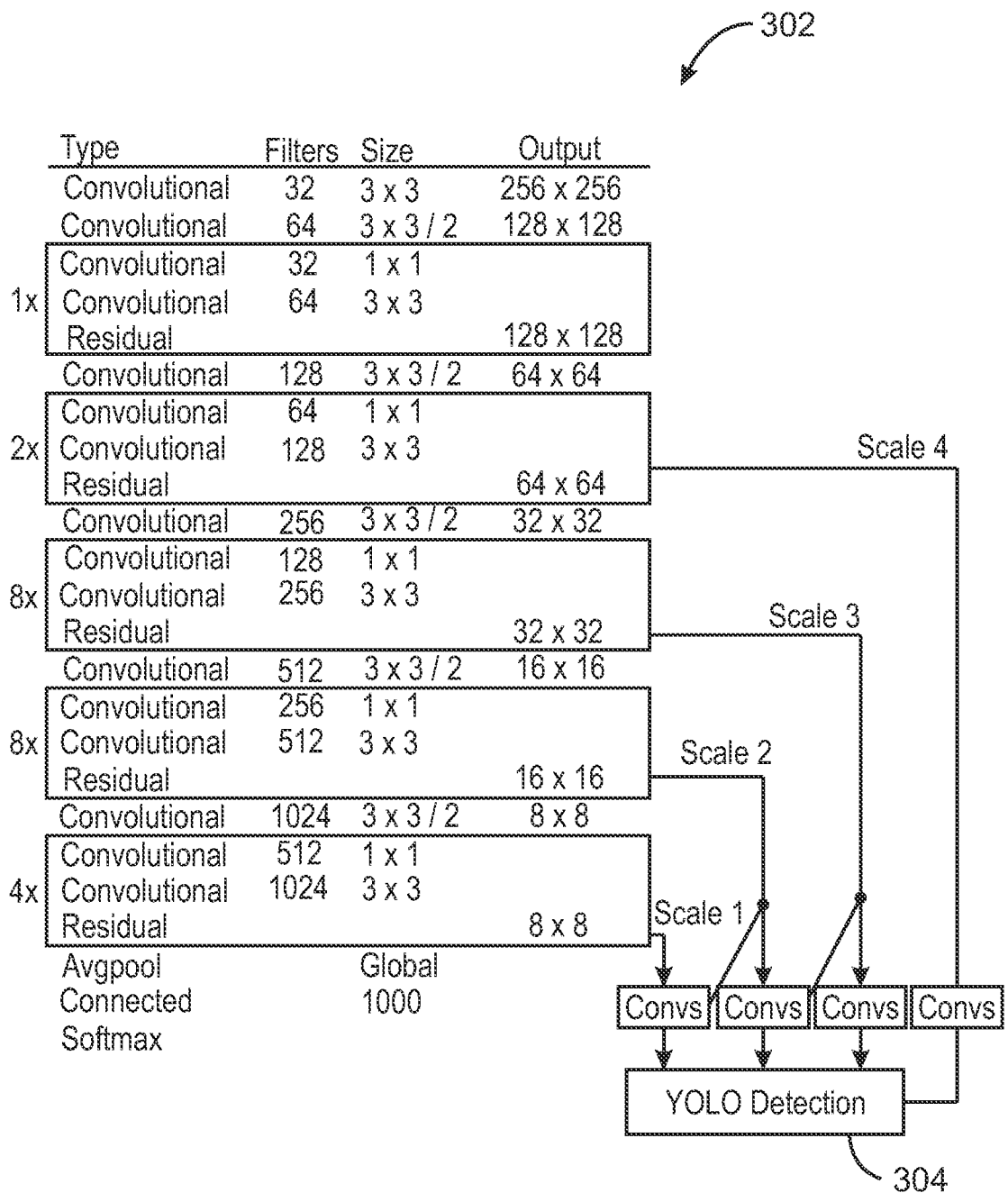
FIG. 3 is an illustration of a neural network and YOLO detection for single-camera player detection (SOD)

FIG. 3 is an illustration of a neural network and YOLO detection for a single-camera player detection (SCD) module 204. The single camera player detection (SCD) module 204 as illustrated in FIG. 3 may be the SCD module 204 of FIG. 1. The SCD module 204 is executed to determine isolated bounding boxes of each player in a single camera view for a number of cameras. In particular, player detection is performed for each camera of the camera system. Optionally, a predefined field mask may be applied to the captured field of play to remove the non-sport field area, such as the audience area and individuals or objects along the sidelines and endlines. A person detection algorithm based on a you only look once (YOLO) detection 304 approach in a multiple camera framework is executed. The person detection algorithm is executed to detect all the players in field of play. As the player size is very small, i.e., 1/25 in height with respect to the full captured image, a dedicated 4th scale layer is added to the convolutional neural network (CNN) 302 technology that is used to detect the relatively tiny person. Moreover, stage 2 of the CNN is concatenated to ensure small objects can be detected.

Furthermore, several other parameters of the CNN are modified to ensure the network is amenable to player detection.

Figure 4:
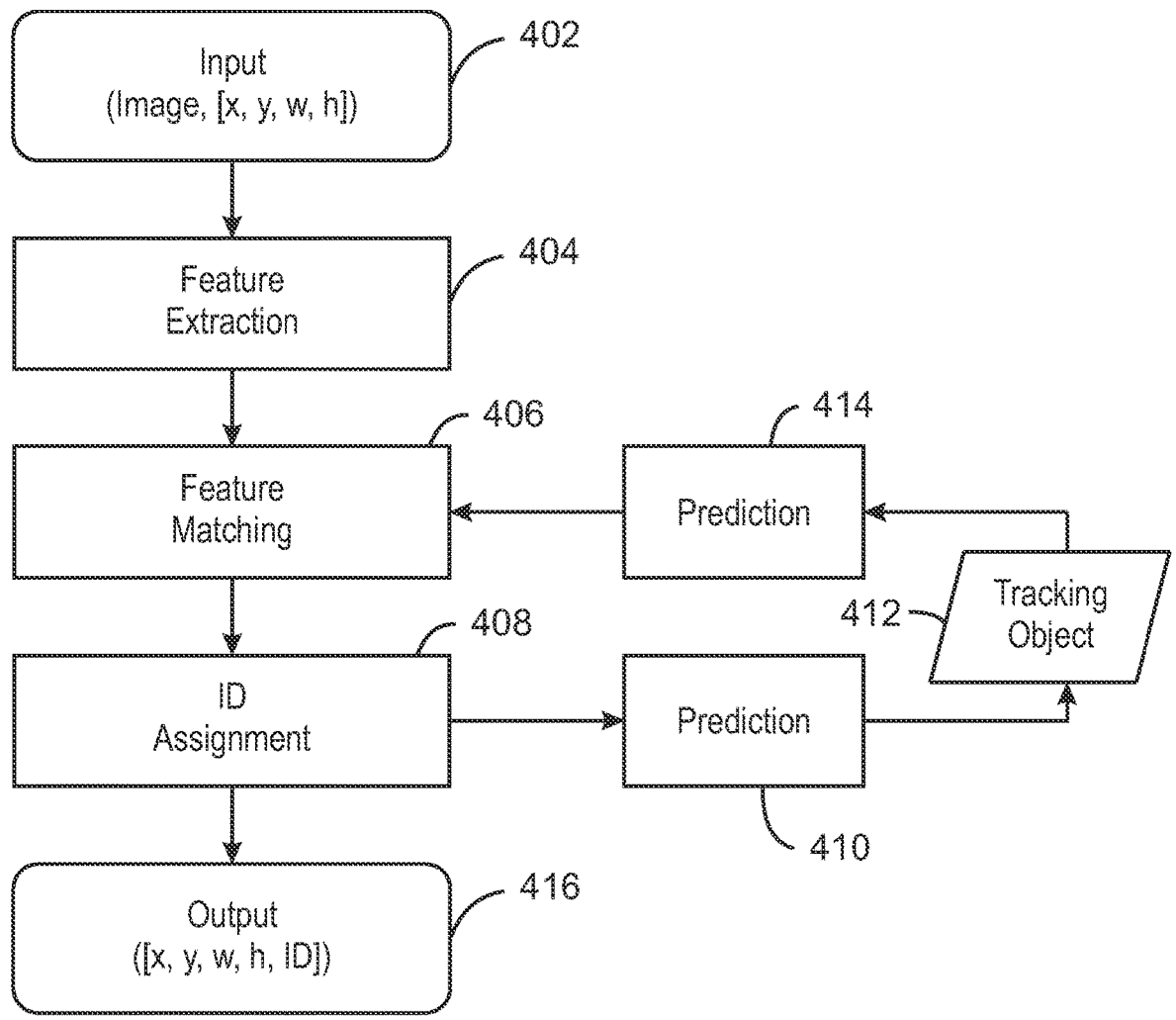
FIG. 4 is an illustration of a process flow diagram of a method 400 that enables single camera player tracking (SOT)

FIG. 4 is an illustration of a process flow diagram of a method 400 that enables single camera player tracking (SCT) 206. The SCT module 206 as illustrated in FIG. 4 may be the SCT module 206 of FIG. 1. The SCT module 206 is executed to derive an association of the bounding boxes of a same player across frames in captured by a single camera, assigning players a unique track ID for each camera view across the frames captured by a single camera. The track ID is unique to each particular camera of the camera system. Accordingly, the same player may have a different track ID for each camera of the camera system. The bounding boxes may be obtained from the SCD module 204. In embodiments, the SCT module 206 locates isolated bounding boxes of a player in each camera view. In some cases, the SCT module 206 may enable tracking by each player in a sequence of frames.

As illustrated in FIG. 4, an input is obtained at block 402. The input may be a particular bounding box found in a frame or an image. The bounding box may be described by a location of the bounding box within the image according to xy coordinates. The width (w) and the height (h) of the bounding box is also given. Features may be extracted from the image at block 404. Appearance and motion features are extracted and are used to associate the same person between continuous frames. Feature matching is executed at block 406 across a plurality of frames. In feature matching, a detected player in one frame is matched with the same player in other frames according to extracted features. If a newly detected player in a new frame can be matched with an existing player (a previously detected player), the new detection is assigned the track ID of the existing player. If the newly detected player in the new frame cannot be matched with any existing player as captured by the single camera view, the newly detected player may belong to a new player who has entered the field. A new track ID is assigned to the newly detected player. In embodiments, feature matching determines a pair of current detection results with the existing tracking object (a previously detected player) via any linear of non-linear assignment algorithm, such as the Hungarian Algorithm. The matching follows an underlying rule of a distance cost matrix between appearance and motion features.

At block 408, identification (ID) assignment occurs. In particular, a tracking object ID is assigned to each bounding box in each frame of a camera view. The unique track ID is derived for each camera of a camera system.

For each unique track ID, a prediction 410/414 can be made while an identified player is continuously tracked using the track ID at block 412. If there is no detection object assigned for the tracking instance of the track ID for a particular frame, it will be marked as lost and will be removed as a valid track ID after certain time. In this manner, when players are substituted off of the field, their track ID is removed from tracking consideration. To make the predictions in blocks 410 and 414, system maintains all historical tracking objects (detected players), which are used to predict and update tracking results by Kalman Filter. In this manner, the SCT module 206 gives the tracking results for each player in a single camera view, for each camera view.

Figure 5:
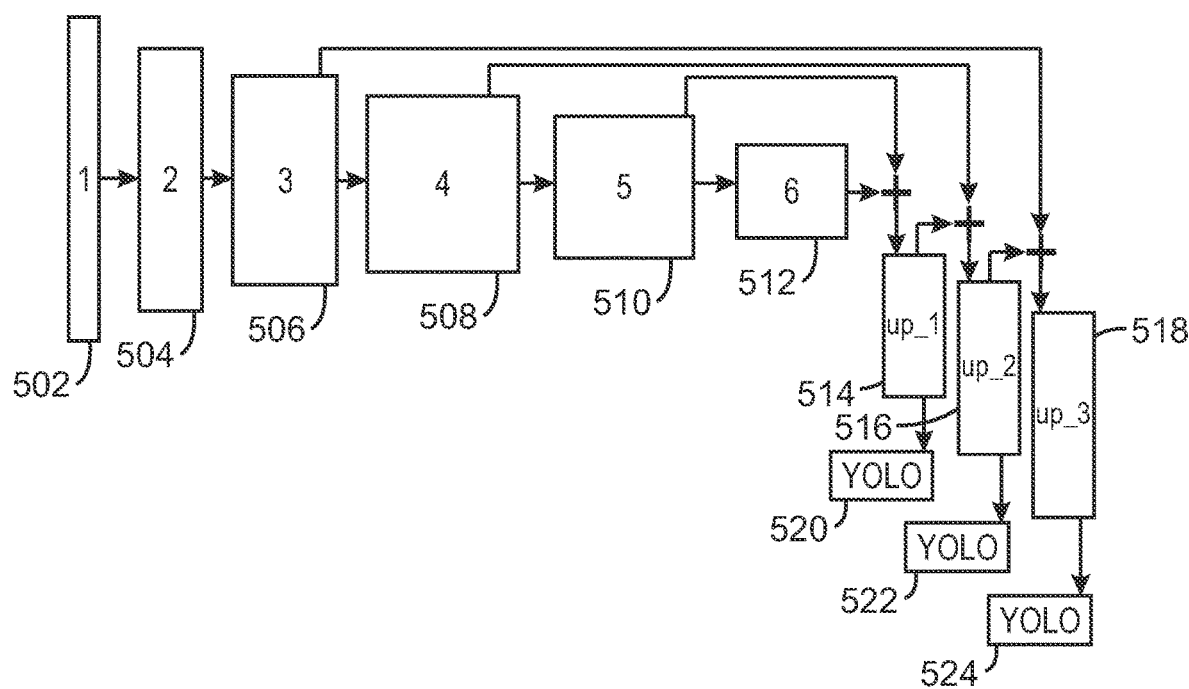
FIG. 5 is an illustration of single camera player jersey number recognition (SJR) module.

FIG. 5 is an illustration of single camera player jersey number recognition (SJR) module 208. The SJR module 208 as illustrated in FIG. 5 may be the SJR module 208 as illustrated in FIG. 1. The SJR module 208 is executed to recognize the jersey number for each player based on the bounding boxes passed from the SCT module 206. Precisely locating the jersey number location plays a critical role to significantly improve the recognition accuracy. In American football game, there are 99 possible jersey numbers, resulting in 99 classification categories ranging from 1-99, and each category represents one unique number. Note that the jersey number is a player identifier. The present techniques may apply to other player identifiers with a greater or fewer number of possible classification categories.

As shown in FIG. 5, a CNN feature extractor network with a number of convolution blocks is used to extract features instead of using an off-of-shelf network. In particular, the neural network as described herein extracts semantic features of jersey numbers from the input player image. The overall structure of the deep CNN network is feature pyramid network which is composed of six down-sample convolution blocks 502, 504, 506, 508, 510, and 512 and three up-sample convolution blocks 514, 516, and 518. It produces three multi-scale features including the high-resolution low-level features and higher-level semantics low-resolution features. Every block consists of 3×3 and 1×1 convolution layers and each convolution layer is followed by a batch normalization and RELU activation. Five 3×3 stride 2 convolution layers are used as down-sample layer at the last layer of down-sample blocks 502, 504, 506, 508, and 510. To save or reduce computation costs, in embodiments 192×192 is used as the input size rather than input size 224×224 or 300×300. Additionally, YOLO detection is applied to the three multi-scale features up-sample convolution blocks 514, 516, and 518, and includes high-resolution low-level features and higher-level semantics low-resolution features to obtain a jersey number for each player within a bounding box.

Figure 6:
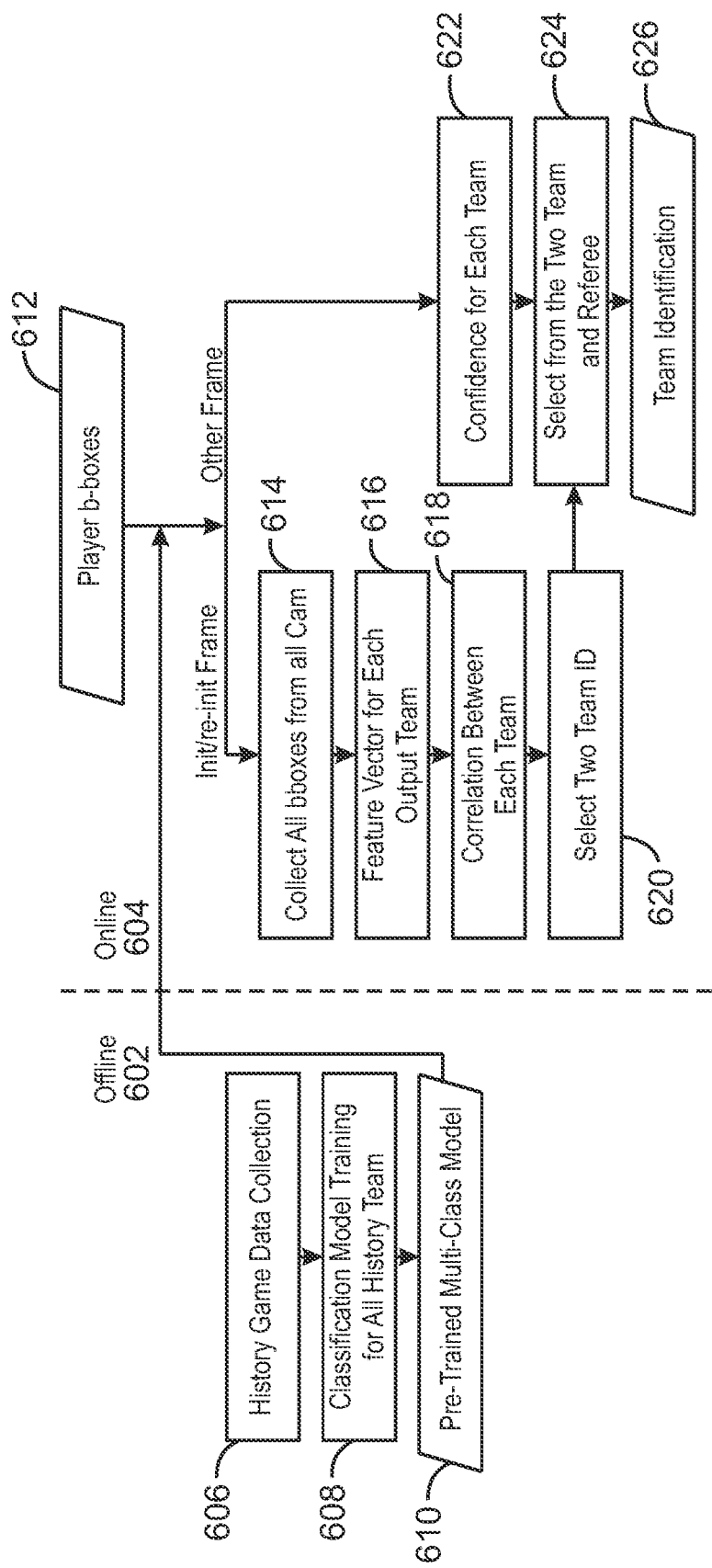
FIG. 6 is an illustration of a process flow diagram of a method 600 that enables single camera player team classification (STC)

FIG. 6 is an illustration of a process flow diagram of a method 600 that enables single camera player team classification (STC) 210. The STC module 210 as illustrated in FIG. 6 may be the STC module 210 of FIG. 1. The STC module 210 is executed to apply a team classification to each player, for each single camera view. Thus, the STC module 210 identifies the team information for each detected player bounding box passed from the single camera player tracking module 206. In particular, the STC module 210 will assign each bounding box with a team class label.

This classification is enabled via both an offline process 602 and an online process 604. In the offline process 602, a set of labelled data is used to generate a model for jersey number classification. Accordingly, at block 606, historical game data collection occurs. This data may include, for example, previous games that occur during a last tournament or weekend of play. Note that team classifications are generally static for each player, such that the team to which a particular player belongs does not change from week to week. Thus, at particular points during a season, game data used to train the module may be updated based on a roster of current players and their team classification. At block 608, a classification model is trained for an all-history team. The all-history team may refer to the historic roster information for a particular season. In this manner, a multi-class model with each class representing a category of player or referee with similar appearance (color and texture) may be trained. In embodiments, for a new game, all players' bounding boxes are collected from a first frame, and the bounding boxes used as the input of the pre-trained model at block 610.

Thus, at block 612 in the online process 604, all players' bounding boxes are collected from a first frame, and the bounding boxes used as the input of the pre-trained model at block 610. For the classification of a current frame, if the frame is a first pass, initialization, or reinitialization frame, process flow continues to block 614. For all other frames, process flow continues to block 622. Beginning with block 614, the two team classes available for the particular game is determined. Accordingly, at block 614, all bounding boxes across all cameras are captured. At block 616, feature vectors for each class or output team are obtained. At block 618, a correlation between each output team is determined. At block 620, a selection of two team classifications for the present game occurs. In particular, two class IDs are selected by comparing an irrelevance between each pair of feature vectors. Process flow then continues to block 624.

At block 622, for all other frames, a confidence that the team classification is correct is determined. The confidence may be determined using an expected precision or recall metrics of the model after training. At block 624, a final selection in the classification occurs. The classification is selected from the team classifications determined at block 620. In embodiments, the current player may be classified as a member of a first team, a second team, or a referee. Thus, at block 626, the team identification or team tag for a current player is output. Then these two IDs together with the referee class in this pre-trained model will be used during the rest of the game.

In embodiments, as the weather and illumination of the field will change over time, a periodic team update policy is executed to ensure the team tag is consistent during the whole game. As used herein, the team tag may be a representation of the team classification. Team classification IDs will be re-computed after a fixed time interval. The time interval may be, for example, five minutes. Then the team class ID at time T will be compared and associated with the team class ID at time (T−1) according to the relevance information. In embodiments, the classification as a referee is a unique class and does not change.

In additional to two team classifications, a home and away team classification is also determined according to the present techniques. In embodiments, third party data may be used to determine the home or away team. For example, third party data includes the jersey number list for two teams and can be obtained before each normal game. With the jersey number and team tag for each player, a confusion matrix against the given jersey list for two teams can be computed. Then the team pair with the highest matching score is then selected. In embodiments, the confusion matrix may be integrated into the PTO module in the player tracking system. For example, in the case where there is a team0 and team1 team classification, the confusion matrix is a 2×2 matrix T. In the confusion matrix, T(0, :) indicates the matching score of (team 0, home team) and (team0, away team), and T(1, :) indicates the matching score of (team1, home team) and (team1, away team). To obtain the matching score, consider an example where Team 0 contains a list of jersey numbers obtained from actual player tracking and the known the home team contains a list of jersey numbers extracted from 3rd party data. The score is proportional to the common jersey numbers Team 0 and the home team.

Figure 7:
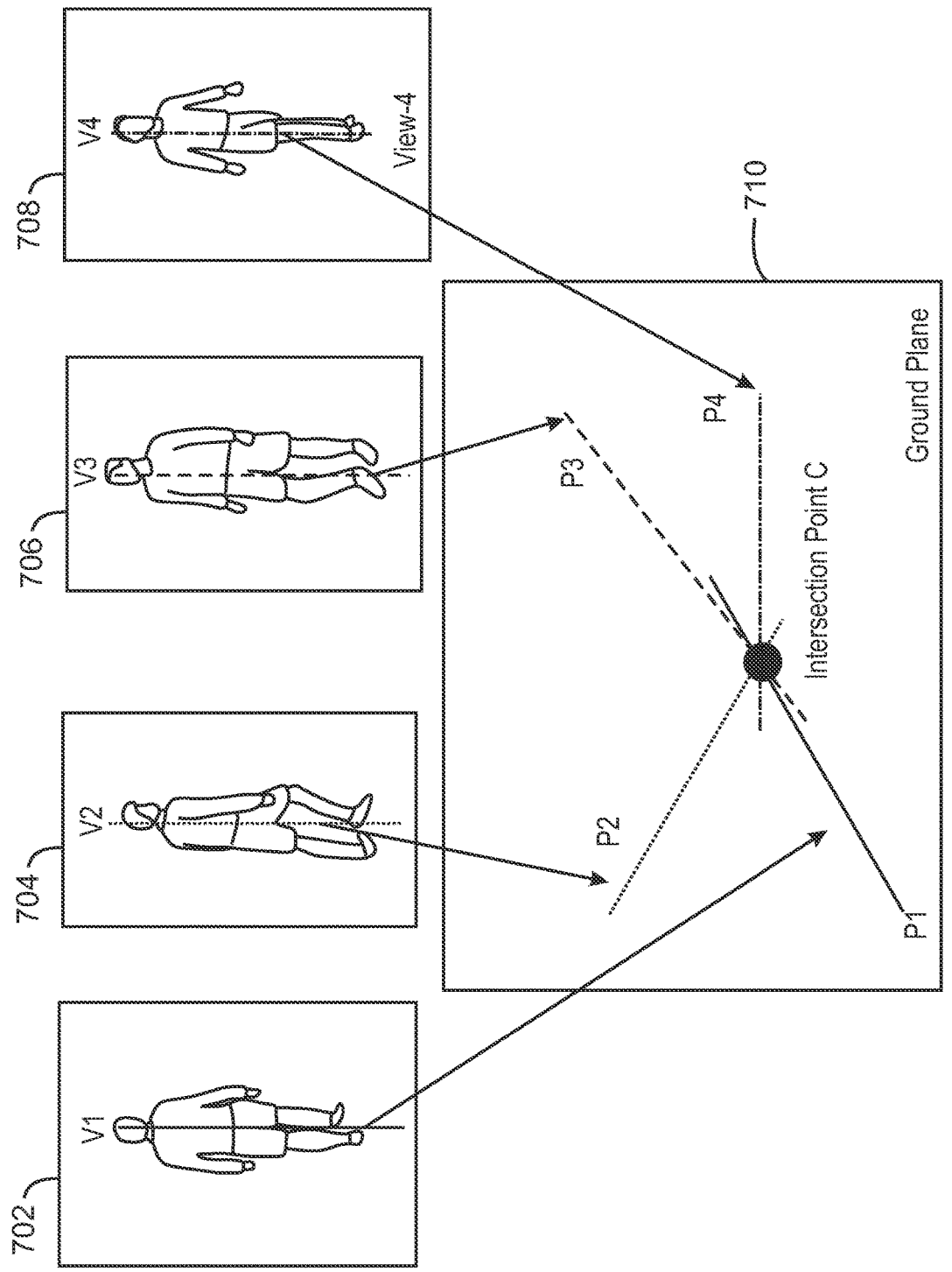
FIG. 7 is a block diagram illustrating the operation of the multiple camera association (MCA) module.

FIG. 7 is a block diagram illustrating the operation of the multiple camera association (MCA) module 212. The MCA module 212 uses bounding boxes of a player in one frame from each camera view to derive a 2D/3D location pf the player in the field of play. Thus, the bounding box 702 that has detected a player with a unique track ID may be obtained from a first camera. The bounding box 704 that has detected the player with a second unique track ID may be obtained from a second camera. The bounding box 706 that has detected the player with a third unique track ID may be obtained from a third camera. Finally, the bounding box 708 that has detected the player with a fourth unique track ID may be obtained from a fourth camera.

The MCA module 212 uses player bounding boxes in one frame at timestamp t from all camera views to associate bounding boxes in multiple views of identical player to the same location and compute a 2D or 3D location in a 2D or 3D space. It exploits the spatial consistency for all players across multiple cameras. In embodiments, a principle line-based correspondence method is executed for player bounding boxes association. The principle line-based correspondence method groups players in a ground plane 710. A distance between a principal line and the group of bounding boxes for one player is used as a metric to determine the player correspondence across frames. To achieve that, a homography matrix is calculated for each camera beforehand by using predefined points in the field of view in order to map any pixel in given camera view to ground plane. Then, a vertical line in each player bounding box (V1, V2, V3, and V4) is estimated in player tracking module. The vertical line is defined as the line crossing the bounding box center vertically. After the vertical line is estimated, the corresponding principle line is obtained by applying the homography transform on vertical line.

Accordingly, FIG. 7 illustrates the same player and a vertical line (V1-V4) from four different camera views. Also, the corresponding principal lines (P1~P4) on the ground plane 710 are calculated. Theoretically speaking, as the foot center lies in the ground, all foot center points from different cameras should map to the same point in the ground plane, indicating that the principal lines in the ground plane should intersect at the same position as shown intersection point C of FIG. 7. As a result, the bounding boxes belonging to the same player can be grouped together and the location of the same player across different views can be derived. In embodiments, the foot center is a center point between the player's feet.

Conventional techniques fail to generate trajectories in view of heavy occlusion and deformation along with similar appearance. The present techniques enable a solution for trajectory generation with multiple cameras in sports video, which is based on identification of all the players in court at any frame, integrated with corresponding jersey and team information. As shown in FIG. 3, the solution uses results of SCT, MCA, SJR and STC as input and get a global player ID and trajectory of each player.

Figure 8:
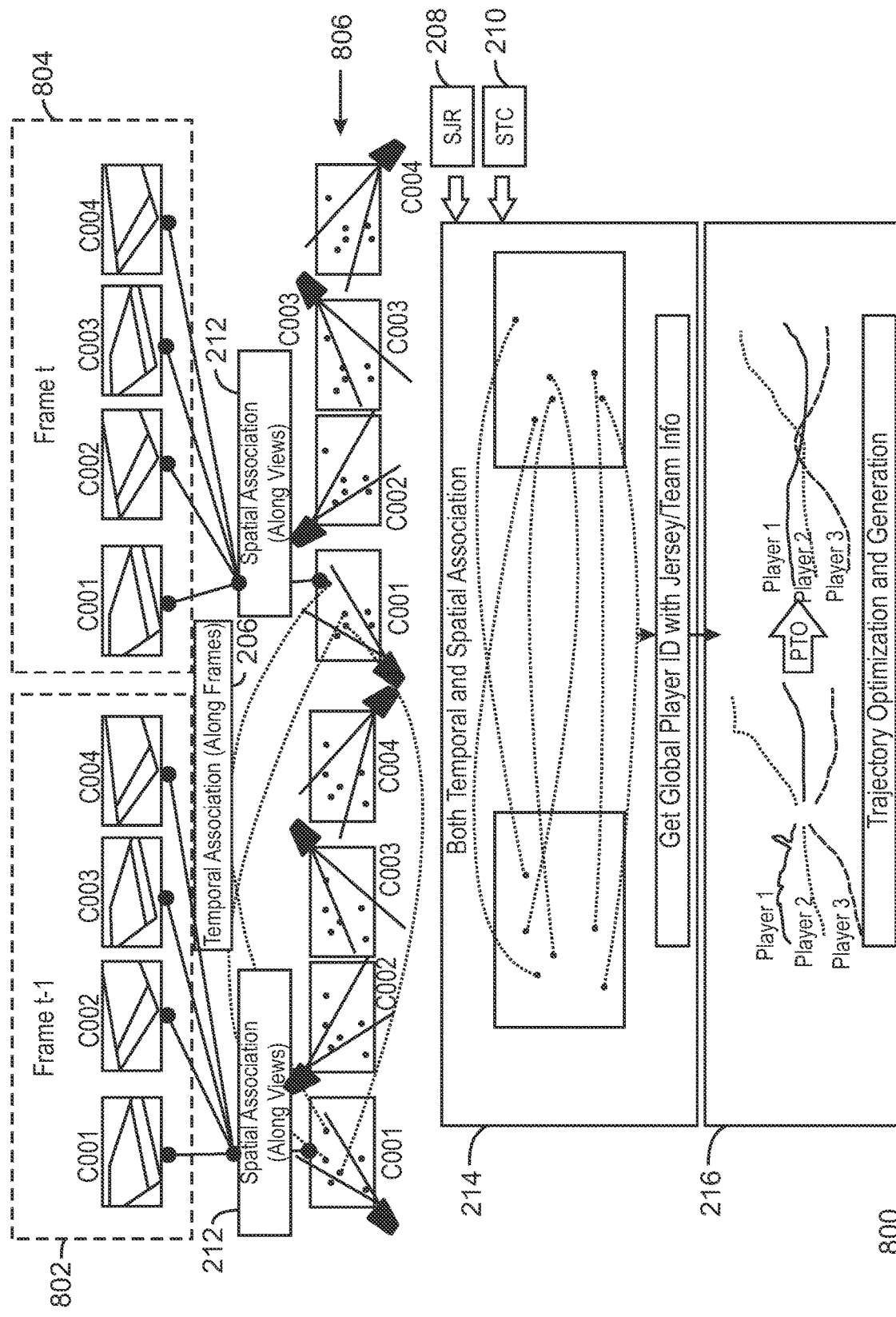
FIG. 8 is a block diagram illustrating operation of a system 800 including a multiple camera tracking (MCT module)

FIG. 8 is a block diagram illustrating operation of a system 800 including a multiple camera tracking (MCT module) 214, and a player trajectory optimization (PTO) module 218. The present techniques can efficiently exploit spatial and temporal consistency. During the multiple track ID association and team/jersey assignment process, both players' location and identification can be obtained, which improves the location and identification accuracy. Furthermore, as each stage may have error (in each module and in specific camera), the present techniques can effectively fix the errors by leveraging the spatial and temporal consistency and greatly improve the overall accuracy. Further, the present techniques can effectively handle the heavy occlusion that is a quite common for multiple players tracking in team sports. The present techniques include two methods to address heavy occlusion—the first is a dedicated occlusion indicator and can quickly recover from occlusion and assign the right team/jersey data, second is trajectory optimization. When the occlusion is too heavy to calculate the player's location, a motion model is used to predict the location. When occlusion is not so heavy and the location is available in part of frames, the locations with low confidence are first removed, then the interpolation and smoothing method is executed based on predicted locations to repair the actual trajectory and finally get the complete trajectory for player.

In the example of FIG. 8, a Frame t−1 802 and a Frame t 804 are illustrated. At Frame t−1 802, a plurality of frames is illustrated. In particular, Frame t−1 802 includes several frames as captured by cameras C001, C002, C003, and C004. Similarly, at Frame t 804, a plurality of frames is illustrated. In particular, Frame t 804 includes several frames as captured by cameras C001, C002, C003, and C004.

A temporal association between the Frame t−1 802 and the Frame t 804 is determined at SCT module 206. A spatial association between the Frame t−1 802 and the Frame t 804 is determined at MCA module 212. In particular, as reference number 806, a spatial association may be derived between different views from the same camera. For example, at reference number 806, the image frame obtained by camera C001 at Frame t−1 802 is associated with the image frame obtained by camera C001 at Frame t 804. The image frames obtained by the remaining cameras C002, C003, and C004 are associated across the Frame t−1 802 and the frame t 804 in a similar manner. The present techniques connect the temporal association (SCT module 206) with spatial associations (MCA module 212) and integrates jersey number and team tag data from SJR module 208 and the STC module 210 to generate trajectories for all players in the field of play.

In particular, the present techniques implement MCT 214 and PTO 218 for trajectory generation. With input data from SCT module 206, MCA module 212, SJR module 208, and STC module 210, the MCT module 214 determines consistent global player IDs with assigned jersey number/team tag and then generates short tracklets of players. A short tracklet is defined as part of the long trajectory of one player. A tracklet is a portion of a trajectory as generated according to any ball detection algorithm as described herein. In this step, there are two processes—multiple track ID association and team/jersey assignment. Multiple track ID association identifies the players between frames and camera views in a shorter time range (such as 80 frames). To generate continuous and stable trajectory, the jersey number and team information cumulative voting are used to connect tracklets from MCT and eliminate outliers by the motion constraints (such as limits on velocity and acceleration) during PTO 218. Finally, a global smoothing mechanism, such as Kalman smoothing or average smoothing, is applied to all trajectories to reduce jittering.

As illustrated in FIG. 8, multiple-person tracking is enabled. This multiple person tracking can be used to enable the generation of a virtual camera. The virtual camera may be used to follow the players to offer a compelling user experience. Furthermore, the technologies can also be used in many other domains like surveillance. The diagram of FIG. 8 is not intended to indicate that the example system 800 is to include all of the blocks shown in FIG. 8. Rather, the example system 800 can be implemented using fewer or additional states and stages not illustrated in FIG. 8 (e.g., players, configurations, cameras, modules, etc.).

Figure 9:
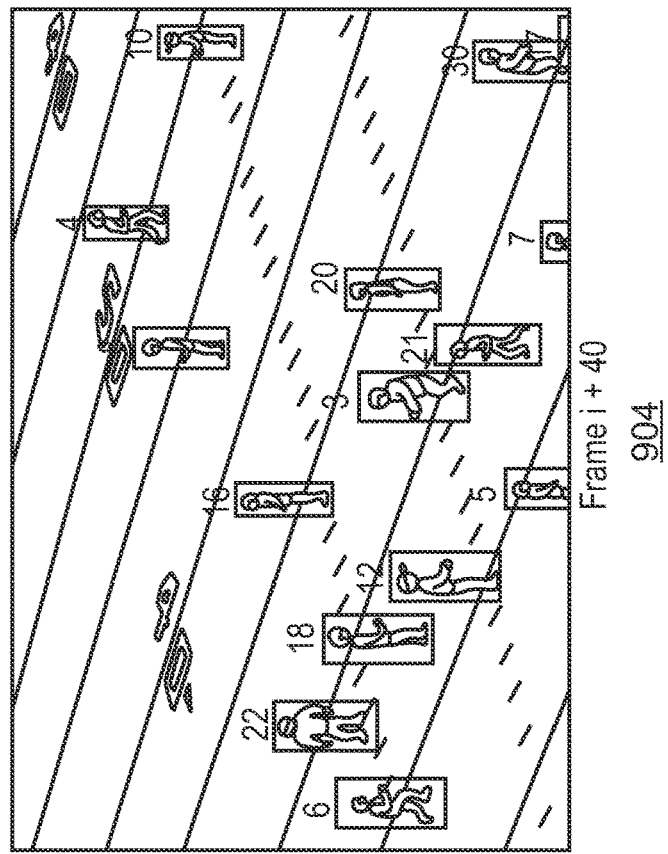
FIG. 9 is an illustration of bounding boxes.
Figure 9:
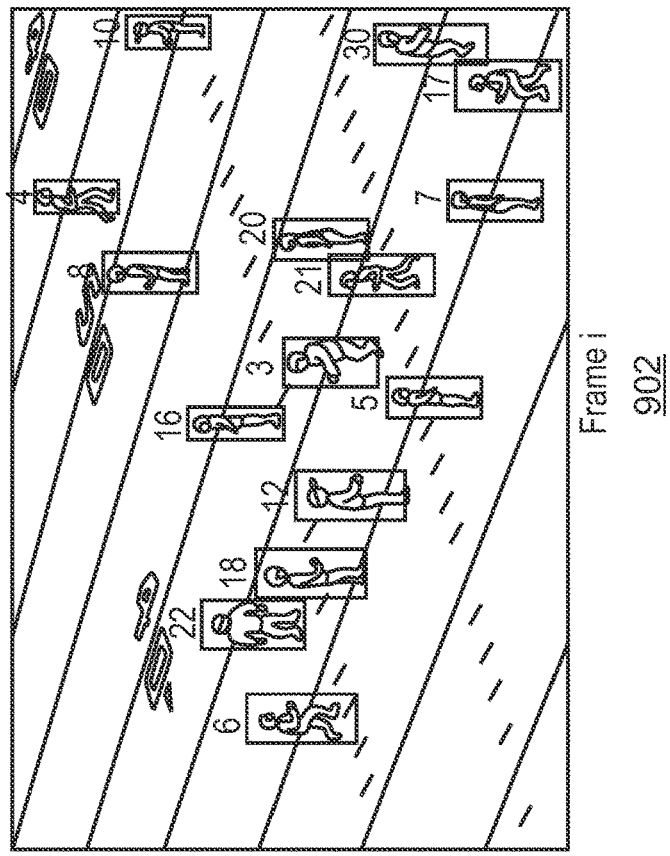

As discussed above, to derive spatial and temporal associations, bounding boxes for each player within the field of play are determined. FIG. 9 is an illustration of bounding boxes 900. In the example of FIG. 9, above each bounding box is a track identification (ID) as described below. Additionally, a Frame i 902 and a Frame i+40 904 are illustrated. The Frame i 902 may be captured via a particular camera aimed at a particular portion of the field of play. The Frame i+40 904 may also be captured by the particular camera aimed at the particular portion of the field of play that captured Frame i 902. The Frame i+40 904 may occur 90 frames from the Frame i 902.

For each frame 902 and frame 904, the data of SCT, SJR and STC results are visually represented as shown in FIG. 9.

Table 1 below describes the data used to determine each bounding box as illustrated in FIG. 9. In particular, each bounding box illustrated in FIG. 9 is associated with a Frame identification, track identification, x, y, w, h, jersey number, jersey confidence, team tag, and team confidence. Similarly, in Table 1, each line of data represents a bounding box at a particular timestamp in a specific camera view, which is formatted as frame id, track ID, x, y, w, h, jersey number, jersey confidence, team tag, team confidence.

TABLE 1

| Frame ID | Track ID | SCT | SJR | STC |
|---|---|---|---|---|
| 4, | 1, | 2352,1581,75,147, | 2, 1.00, | 2, 0.9999 |
| 4, | 3, | 2364,1464,67,184, | −1, 0.00, | 2, 0.9985 |
| 4, | 4, | 3922,1666,70,153, | −1, 0.00, | 2, 0.9998 |
| 4, | 5, | 1456,1404,73,132 | −1, 0.00, | 5, 1.0000 |
| 4, | 6, | 3290,1700,70,141 | −1, 0.00, | 2, 1.0000 |
| 4, | 19, | 2030,1560,142,147 | 67, 0.99, | 1, 0.9999 |
| 4, | 20, | 2245,1567,85,174 | −1, 0.00, | 2, 1.0000 |
| 4, | 21, | 2742,1522,150,153 | 55, 0.98, | 1, 0.9999 |
| 4, | 22, | 355,1757,46,192 | −1, 0.00, | 5, 1.0000 |
| 4, | 23, | 2167,1590,81,173 | 90, 1.00, | 1, 0.9999 |
| 4, | 24, | 2136,1564,86,140 | 90, 1.00, | 1, 0.2257 |

The data illustrated in FIG. 9 and represented in Table 1 is taken from a single camera view at a particular timestamp. Note that the present techniques obtain similar data for other remaining camera views. For example, in an embodiment of the present techniques, there may be eighteen cameras strategically placed to capture an American Football field of play. For ease of description, the present techniques may be described using eighteen cameras in total. However, any number of cameras may be used. Thus, in an embodiment, at a particular timestamp, there may be eighteen instances bounding boxes as described with respect to FIG. 9 and Table 1, one for each camera or camera view.

In Table 1, frame ID is an identification of the current frame. In the example of FIG. 9, the frame ID is four. However, the frame ID may be any unique value or other identifier that can distinguish the current frame from another frame. The track ID is a player identification generated via the single camera player tracking (SCT) module in current frame and current camera view. In embodiments, SCT associates the bounding boxes of a same player among adjacent frames in a same camera view. Associating a player across multiple frames from a single camera creates a temporal association of the player. As used herein, a temporal association may refer to the relation of a single player across multiple frames at various sequential timestamps obtained from a single camera or capturing a single camera view.

Accordingly, for each of the bounding boxes 900 in FIG. 9, a temporal association is created from frame 902 to frame 904 for the single camera view. In particular, the track IDs as illustrated in FIG. 9 tracks the players across a sequence of frames and associates the frames relative to each player.

Referring again to Table 1, quadruple (x,y,w,h) defines the top-left corner coordinates and width/height of each player bounding box in a specific camera view, like the colored bounding boxes in FIG. 9. The last 9 numbers correspond to jersey number, a confidence associated with the jersey number, a team tag, and a confidence associated with the team tag recognized from each bounding box.

The diagram of FIG. 9 is not intended to indicate that the example of FIG. 9 is to include all of the frames 900 and IDs shown in FIG. 9. Rather, the example frames 900 can be implemented using fewer or additional states and stages not illustrated in FIG. 9 (e.g., players, configurations, identifications, etc.).

As described above, the track IDs for a particular player are the same across frames from a particular camera view. The track IDs for each camera may also be associated with track IDs from other cameras. Thus, the input data may include track IDs association across different camera views at any specified frame/timestamp. In particular, a multiple camera association (MCA) module may associate track IDs from each camera view. As used herein, associating track IDs across different camera views refers to determining a same player in each camera view where the player is present. In embodiments, a multiple camera association (MCA) module uses the results of single camera player tracking (SCT) results from all camera views to generate 2D/3D player locations and associate the bounding boxes of identical player from camera views to each player location. In this manner, track IDs for an identical player in different camera views are associated spatially across camera views. Associating a player across multiple camera views creates a spatial association of the player. As used herein, a spatial association may refer to the relation of a single player across multiple camera views. Table 2 below illustrates a spatial association across camera views. This data may be generated via multiple camera association (MCA).

TABLE 2

| 4, | 0, | 854,049,810.513, | −1,−1,−1,14,−1,−1,−1,3,1,3,−1,3,4,9,1,1,1,4 |
|---|---|---|---|
| 4, | 1, | 713,065,770.987, | −1,−1,−1,−1,−1,−1,−1,8,2,13,−1,5,5,1,11,3,3,3 |
| 4, | 2, | 735.559,1084.865, | 2,−1,−1,17,10,−1,−1,12,3,−1,−1,−1,11,5,−1,−1,−1,9 |
| 4, | 3, | 819,469,978.860, | −1,−1,−1,1,12,−1,−1,11,4,10,−1,−1,23,16,−1,−1,−1,18 |
| 4, | 4, | 793,433,890.320, | −1,−1,−1,10,7,−1,−1,2,5,6,−1,−1,6,12,2,−1,−1,1 |
| 4, | 25, | 840,317,976.025, | −1,−1,−1,23,14,−1,−1,−1,−1,21,−1,−1,18,21,5,−1,−1,20 |
| 4, | 26, | 738,720,905.817, | −1,−1,−1,−1,5,−1,−1,10,−1,19,−1,−1,−1,19,−1,−1,−1,−1 |
| 4, | 27, | 764.838,1002.118, | 4,−1,−1,−1,2,−1,−1,−1,−1,−1,−1,−1,−1 ,27,15,−1,−1,16 |
| 4, | 28, | 804,278,970.235, | −1,−1,−1,8,−1,−1,−1,−1,−1,17,−1,−1,−1,17,−1,−1,−1,−1 |

In Table 2, each line of data represents an "associated" player at certain frame, with a set of SCT track IDs from all camera views. As the 1st line in FIG. 6, the first 4 numbers show that the player with index 0 in frame 4 is now at location (854.049, 810.513) (here we use 2D position for example). The following numbers are the track IDs by single camera player tracking (SCT) of the same player in the remaining camera views, respectively. Track IDs of −1 indicate that player is not visible in those camera views. Take the first line in FIG. 5 as an example, the player with index 0 is invisible in 7 of 18 camera views.

Figure 10:
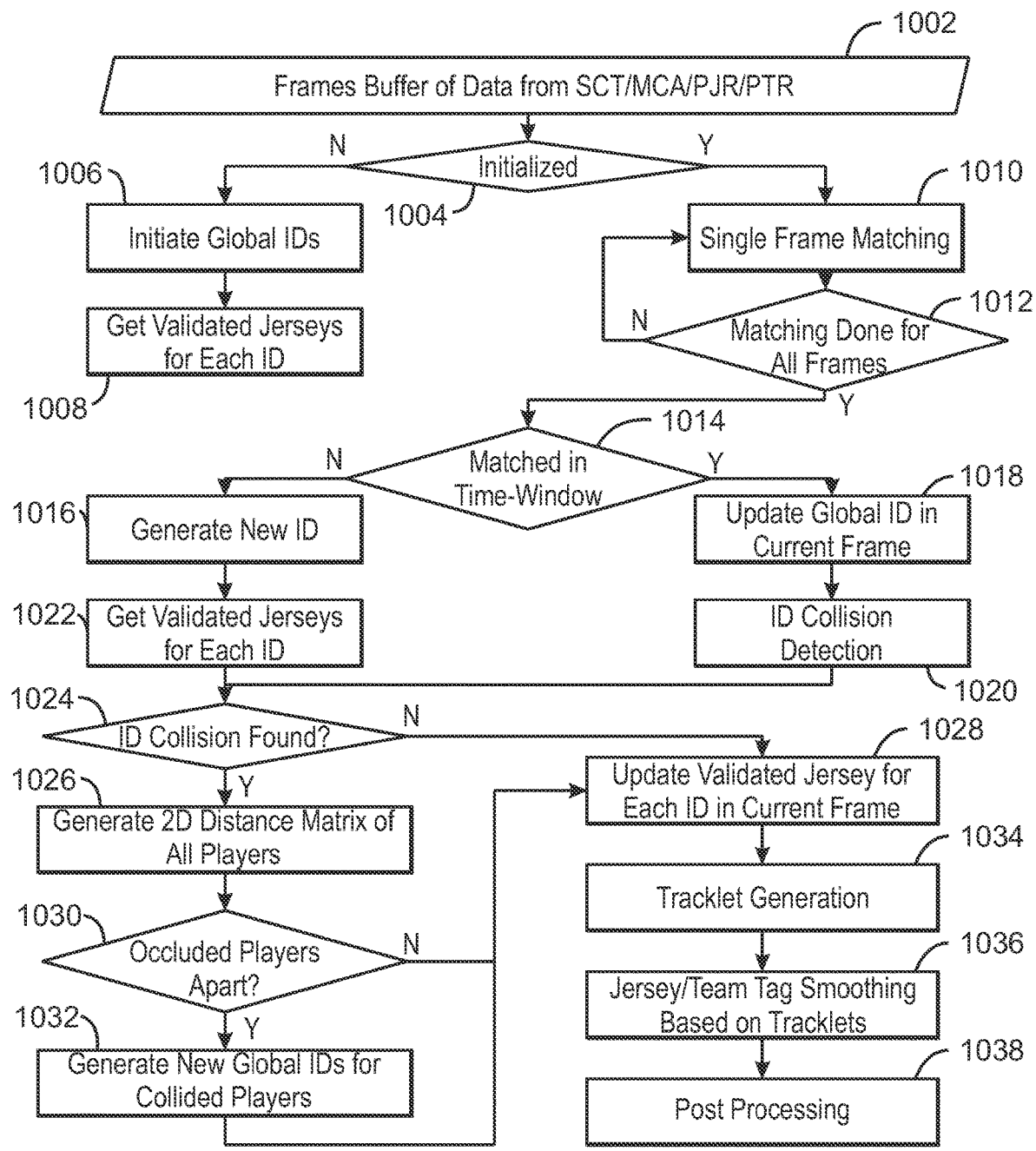
FIG. 10 is a block diagram of a method for multiple player tracking (MOT)

In above section, the data from SCT, MCA, SJR and STC works as input data. A multiple camera and multi-player tracking (MCT) process is then designed to extend the association in both temporal and spatial domain and find matched players both spatially and temporally. FIG. 10 is a block diagram of a method 1000 for multiple player tracking (MCT). Multiple player tracking is used to derive an association or correspondence of players both spatially and temporally. At block 1002 of the method 1000, input data is obtained. The input data may include frames of data from single camera player tracking, multiple camera association, single camera player jersey number recognition, and single camera player team classification. Thus, the input data includes an identification and tracking data of a player across frames of a single camera view, and association of each player across multiple camera views, and identification of the jersey number associated with a player, and identification of a player team classification for each player. The input data may be as described with respect to Table 1 and Table 2 above.

At block 1004 it is determined if the multiple camera tracking is initialized. If the multiple camera tracking is not initialized, process flow continues to block 1006. At block 1006, global identifications are initiated. Thus, when multiple camera tracking has not been initialized, global IDs do not exist for each player. Thus, at block 1006 an initial ID is generated for each player. At block 1008, for each global ID, valid jersey numbers are obtained. If the multiple camera tracking is initialized, process flow continues to block 1010. At block 1010 single frame matching is enabled. As used herein, single frame matching is further described with respect to FIG. 11. Generally, single frame matching is executed for a current frame and each frame in a time window. Thus, if the window size is 15, single frame matching is executed 15 times for each frame in a time window.

At block 1012, it is determined if single frame matching is complete for all frames. If single frame matching is not complete for all frames, process flow returns to block 1010. If single frame matching is complete for all frames, process flow continues to block 1014. At block 1014 it is determined if, for each global ID, if the global ID is matched and a time window. If there is not a match in the time window process flow continues to block 1016. At block 1016, a new identification is generated. At block 1022, validated jerseys for each ID are obtained. If there is a match in the time window, process flow continues to block 1018. At block 1018 a global ID is updated for the current frame. At block 1020 identification collision detection occurs. Collision is a case where several players are very close, or their respective bounding boxes are overlapping. A distance between players is determined to detect the collision on ground plane. As the bounding boxes may not be accurate, a distance threshold of 0 is not used. The distance threshold may be greater than 0, such as 0.5 meters (m) for the threshold to detect a collision. At block 1024, it is determined if identification collision is found. If identification collision is found, process flow continues to block 1026. If identification collision is not found, process flow continues to block 1028.

At block 1026, a two-dimensional distance matrix of all players is generated. For example, the distance metric may be a matrix Ai,j, where each element a(i,j) is the distance between player i and player j. At block 1030, it is determined if occluded players are now separated for a part. If the occluded players are not separated or apart, process flow continues to block 1028. If the occluded players are separated or apart, process flow continues to block 1032. At block 1032, new global IDs are generated for layers in the identification collision. At block 1028, a validated jersey is updated for each ID in the current frame. At block 1034, tracklets are generated for each global ID. At block 1036, jersey and team tag smoothing occurs based on the generated tracklets. At block 1038, postprocessing occurs. Postprocessing may include rules of policies to exclude unreasonable results, such as two or more of the same jersey numbers in one team on the same play or down. Note that in American football, two players may share the same jersey number though they may not play during the same down. As illustrated in FIG. 10, extended association matches the track ID sets of different players from SCT in adjacent frames.

The diagram of FIG. 10 is not intended to indicate that the example finite state machine 1000 is to include all of the states and stages shown in FIG. 10. Rather, the example timeline 1000 can be implemented using fewer or additional states and stages not illustrated in FIG. 10 (e.g., players, configurations, modules, etc.).

Figure 11:
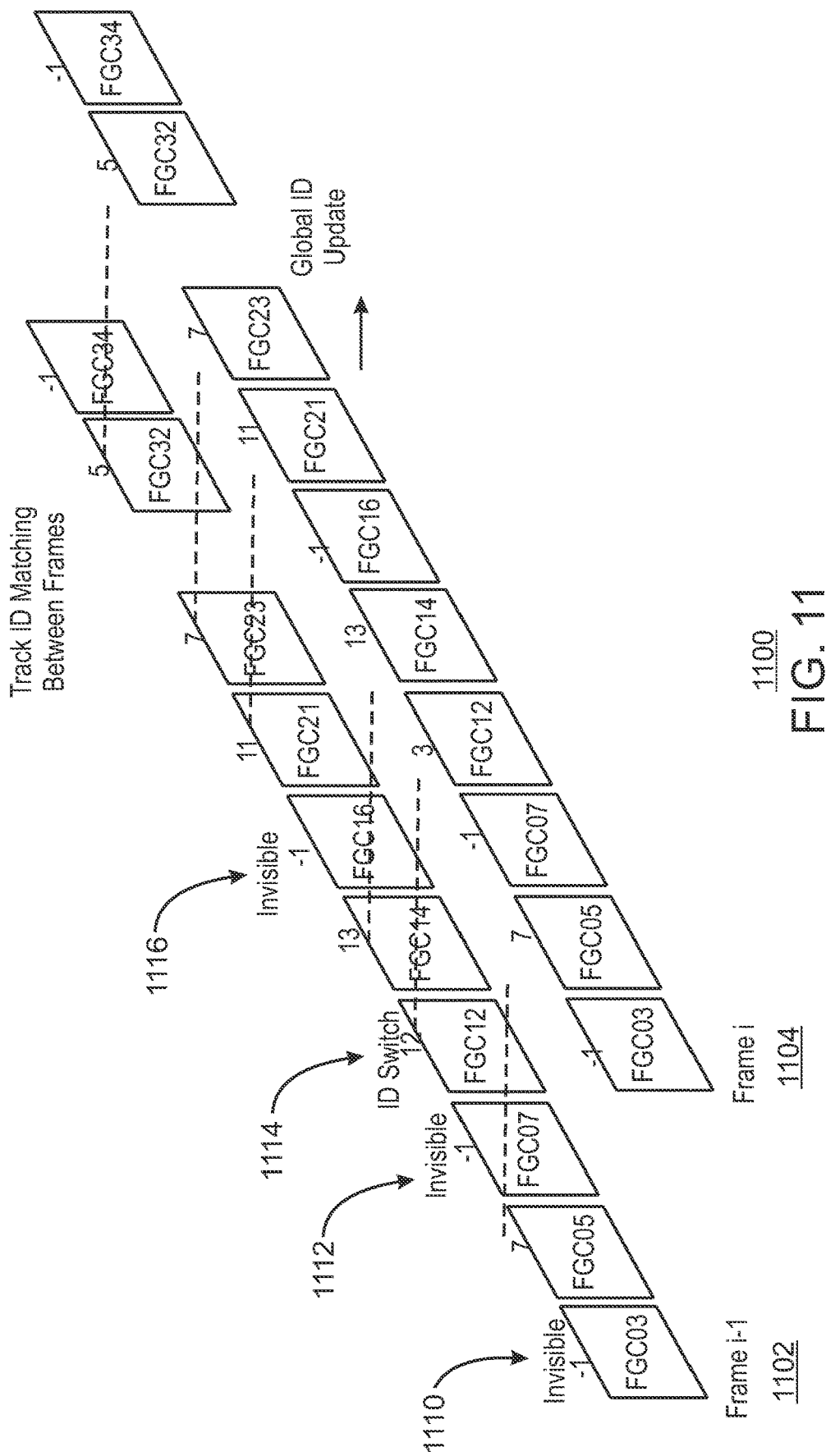
FIG. 11 is an illustration of the matching process.

FIG. 11 is an illustration of the matching process 1100 as executed by the MCT module 214 for a player in frame t 1104 and its matched player in frame t−1 1102. The MCT module 214 as illustrated in FIG. 11 may be the MCT module 214 of FIG. 1. The MCT module 214 is executed to determine a consistent global player ID with assigned jersey number/team tag in order to generate short tracklets of a player. The MCT modules 214 exploits two kinds of association—SCT for temporal domain (across frames) and MCA for spatial domain (across camera views) and generates the global player ID of each player in the playfield. A short tracklet is defined as part of the long trajectory of one unique player. A multiple track ID association identifies the players between frames and camera views in a shorter time range (for example, 30 frames). The basic idea of extended association is to match the track ID sets of different players from SCT in adjacent frames. FIG. 11 illustrates the matching process for a player in frame t and its matched player in frame t−1.

Each block of the Frame i−1 1102 and the Frame i 1104 represents a different camera view, with a track ID noted above each camera view. The cameras illustrated in FIG. 11 include frame grabbing camera (FGC) FGC03, FCG05, FGC07, FCG12, FGC14, FGC16, FGC21, FGC23, FGC32, and FGC34. Recall that track IDs of −1 indicate that player is not visible in those camera views. The inconsistent track ID for the same player between current frame t and frame t−1 come from 2 cases—a player going invisible and an ID switch. If the player is invisible in succeeding frame, the track IDs of the player in this view will be treated as inconsistent. The other inconsistent case is caused by the track ID switch from current player to another, which is very common in SCT.

Another part of input data is track IDs association across different camera views at any specified frame. The part of data is from MCA, which uses SCT results from all camera views to associate bounding boxes of the identical player. That means track IDs from SCT for identical player in different views are associated spatially across camera views.

For the first frame of initialization, the indexes of player are used to initialize the global player ID. In the following frames, each player that successfully finds matched players in buffer uses the global player ID of matched player. A new global player ID will be assigned to the player failing to find matched player in the buffer. Therefore, in the multiple-camera tracklet generation (MCT) phase, a global tracklet ID is generated by exploiting both spatial and temporal domain (MCA and SCT).

Thus, FIG. 11 is a block diagram illustrating matching player track ID sets. Denote the track ID set of one player in all used camera views at frame t as $ID_{Ci}^{t} = \{ID_{C0}, ID_{C1}, \ldots, ID_{Cn}\}^{t}$, where $ID_{Cn}$ means the track ID by SCT in camera view Cn. Then the track ID set of one player at frame t−1 with same camera views is $ID_{Ci}^{t-1}$. The association of track ID sets is to find the target player m in previous frame with the most consistent track IDs.

$$Player_{target} = Player_m \Big| \operatorname*{argmax}_m [\#(IDm_{Ci}^t == ID_{Ci}^{t-1})], IDm_{Ci}^t > -1 \quad (1)$$

In the example shown in FIG. 11, camera views and corresponding track IDs for one player are listed at previous frame i−1 1102 and current frame i 1104, respectively. In some views, for example, view FGC04 at reference number 1110, the track ID is the same between the frames. The inconsistent track IDs for the player between current frame i and frame i−1 come from 2 cases—invisible players due to occlusion and an ID switch. If the player is invisible in succeeding frame, the track IDs of the player in this view will be treated as inconsistent. The other inconsistent case is caused by the track ID switch from current player to another. Again, as illustrated in FIG. 11, there are 5 camera views in total that have a consistent track ID for the player in adjacent 2 frames. As the number of consistent track IDs, 5 is a considerable value regard to total camera views of 18. The player with the set of track IDs in frame t−1 may be considered a matched player. In practice, a temporal buffer of track IDs is extracted from up to N consecutive frames (normally N=30) to generate more confident matching results. The matching of track ID sets between 2 frames as illustrated in FIG. 8 turns into matching between N frames for one player.

In practice, as there are many occlusions between players and subsequent inaccurate association between views, we do not find matched player based on single frame matching in FIG. 11. Instead, we use a temporal buffer of track IDs extracted from up to N consecutive frames (normally we set N=30) to generate more confident matching results. For the case with buffer, the matching of track ID sets between 2 frames turns into matching between N frames for one player. The other difference is the index of player in each frame cannot be used. As the indexes of the same player are not same for all the frames in the buffer, we replace the index of player with global player ID.

Similar to Eq. (1), we denote matched target player in frame t−1 as $$Player_{target,t-1} = Player_m \Big| \operatorname*{argmax}_m [\#(IDm_{Ci}^t == ID_{Ci}^{t-1})], IDm_{Ci}^t > -1 \quad (2)$$

Target player in frame t−2 is denoted as:

$$Player_{target,t-2} = Player_m \Big| \operatorname*{argmax}_m [\#(IDm_{Ci}^t == ID_{Ci}^{t-2})], IDm_{Ci}^t > -1 \quad (3)$$

Target player in frame t−N is denoted as $$Player_{target,t-N} = Player_m \Big| \operatorname*{argmax}_m [\#(IDm_{Ci}^t == ID_{Ci}^{t-N})], IDm_{Ci}^t > -1 \quad (4)$$

Then the matched player by matching with buffer is defined as player with the most occurrence during N times of matching.

$$Player_{target} = Player_{target,t-i} \Big| \operatorname*{argmax}_i [\#(player_{target,t-i})] \quad (5)$$

For the first frame of initialization, the indexes of player are used to initialize the global player ID. In the following frames, each player that successfully finds matched players in buffer uses the global player ID of matched player. A new global player ID will be assigned to the player failing to find matched player in the buffer.

After association of track ID set, jersey number and team tag assignment are applied for the associated player as illustrated in the jersey/team assignment block 216 of FIG. 2. The assignment is a voting process to extract the most recognized jersey number and team tag from the bounding boxes of matched player in all camera views.

Take jersey assignment as example, if the matched player in the buffer frames has the global player ID marked as $gID_i$, then each $gID_i$ has a set of track IDs$\{tID_i\}$, at ith frame in the buffer, for example

[−1, 12, 5, 13, −1, 7, 20, 3, 2, −1, −1, −1, −1, 8, 7, 10, 24, 17]

It contains 18 track IDs corresponding to 18 views. For each $tID_i$ with $tID_i > -1$, it must have an associated bounding box of player with recognized jersey number $tID_{jersey}$, all the $tID_{jersey}$ from 18 track IDs from all views forms the jersey number set,

[−1, 39, 38, 39, −1, 39, 3, 39, 9, −1, −1, −1, −1, 33, 39, 39, 9, 3]

Thus, for each frame in the buffer, the estimated jersey number for the player recognized most frequently is obtained. The estimated jersey number in the example above is 39. In the next step, second-level voting is applied to N estimated jersey number from the 1st to the 29th frame in buffer. In this manner, the jersey number with most occurrence in the N-frame buffer is obtained. The process for team tag assignment is similar.

After jersey number/team tag assignment, the result of MCT process is obtained. The MCT process includes contains two parts. The first part is global player IDs allocated for all 2D/3D locations from MCA as shown in the left of Table 3 below. The other part is global player jersey/team correspondence in the right of Table 3 that includes 3 columns of global player ID, jersey number and team tag for each player.

TABLE 3

| Frame ID | Global Player ID | 2D/3D Locations | Global Player ID | Jersey Number | Team Tag |
| --- | --- | --- | --- | --- | --- |
| 6, | 1, | 854.536, 807.387, 69.252, 9.207, −169.403 | 1, | 23, | 1 |
| 6, | 2, | 711.985, 768.201, −73.920, 9.469, −209.166 | 2, | 21, | 1 |

TABLE 3-continued

| Frame ID | Global Player ID | 2D/3D Locations | Global Player ID | Jersey Number | Team Tag |
|---|---|---|---|---|---|
| 6, | 3, | 735.576, 1084.729, −49.558, 7.935, 107.437 | 3, | −1, | 5 |
| 6, | 4, | 819.626, 974.298, 33.253, 8.365, −3.346 | 4, | 95, | 2 |
| 6, | 5, | 792.503, 885.911, 7.027, 9.428, −91.103 | 5, | 52, | 1 |
| 6, | 6, | 885.554, 897.826, 100.999, 7.900, −79.911 | 6, | 17, | 2 |
| 6, | 25, | 806.819, 1019.894, 21.332, 11.555, 42.762 | 25, | , 1 | 2 |
| 6, | 26, | 841.144, 978.923, 56.373, 8.030, 3.180 | 26, | 90, | 1 |
| 6, | 27, | 739.062, 904.225, −45.808, 8.115, −73.087 | 27, | 19, | 2 |
| 6, | 28, | 765.801, 999.836, −20.298, 9.022, 22.168 | 28, | 88, | 2 |
| 6, | 29, | 807.005, 978.141, 20.746, 10.107, −5.396 | 29, | 95, | 1 |
| 6, | 30, | 729.699, 891.368, −54.789, 7.930, −85.099 | 30, | 24, | 1 |
| 6, | 31, | 741.226, 899.758, −18.731, 20.560, −43.030 | 31 | −1, | 2 |

The MCT module according to the techniques described herein can deal with some cases of multi-player occlusion by the extended association. But it is not possible to infer all players' identity for extreme occlusion case with 100% accuracy. In these cases, the failure or error of tracking will propagate or accumulate and tracking performance will degrade in these frames with heavy occlusion. To recover the tracking from unavoidable failure in heavy occlusion, an indicator is created to detect the occlusion of players and propose a tracking recovery mechanism after occlusion.

The indicator contains 2 parts—same global player ID (ID collision at block 1020 in FIG. 10) detection and occlusion detection by player distance matrix. The duplication of global ID for player usually means the extended association fails to identify occluded players across multiple cameras. While the small distance values in the distance matrix usually means the results may be unreliable due to close/occluded players. When this indicator shows adjacent players' status change from occlusion to non-occlusion/separation, the MCT process for the related players is reset to allocate new global IDs for them and make jersey/team assignment immediately. This reset helps MCT to recover consistent tracking from tracking error/failure during heavy occlusion.

The diagram of FIG. 11 is not intended to indicate that the example matching process 1100 is to include all of the frames and views shown in FIG. 11. Rather, the example matching process 1100 can be implemented using fewer or additional frames and views not illustrated in FIG. 11 (e.g., players, configurations, camera views, track IDs, etc.).

Figure 12:
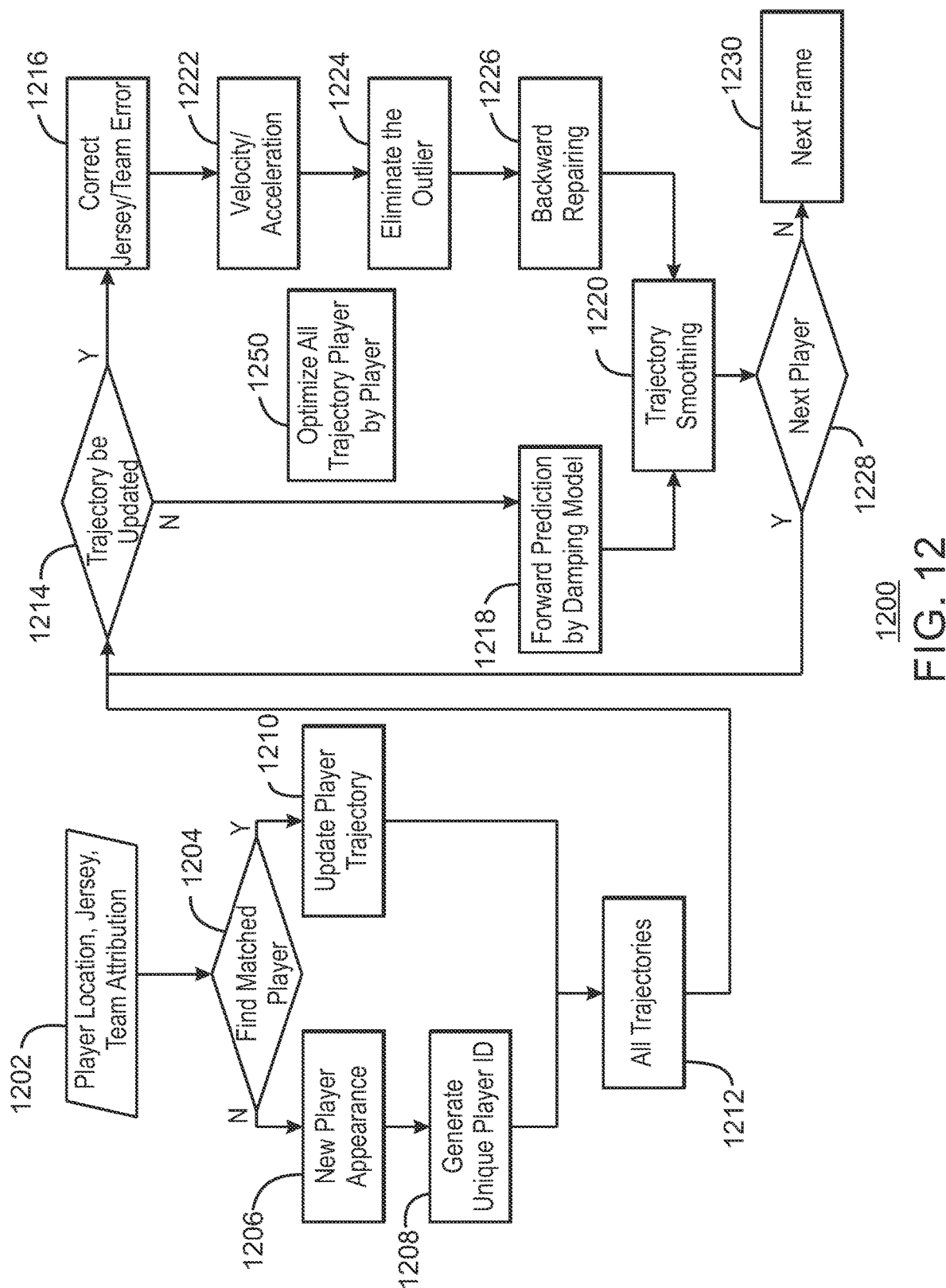
FIG. 12 is a process flow diagram of a method for player trajectory optimization.

FIG. 12 is a process flow diagram of a method 1200 for player trajectory optimization. The PTO module generates a contiguous long trajectory for each unique player according to the global player ID and related jersey/team information. As the MCT process only generates reliable, short tracklets in a short period of time, it is important to connect tracklets from MCT through fusing the jersey/team data and eliminate outliers with motion constraints. Furthermore, a global smoothing mechanism is applied to all trajectories to reduce jittering.

To concatenate separated tracklets and resolve the failure cases in previous modules, PTO module is designed to generate smooth trajectory with high confidence for each player. It corrects false assigned jersey number/team tags, connects broken/short tracklets of the same player, and smooths the trajectory with post-processing. PTO processes each frame with a fixed length frame buffer and keeps all tracklets information of one player in N frames, e.g., N=30. For each player, PTO merges all the tracklets and updates the target trajectory frame by frame. In particular, when occlusion is not heavy and the player's location is available in several non-contiguous frames, we delete the outliers and recover the missing locations by interpolation and smoothing. When the occlusion is heavy and we cannot get the locations within consecutive frames, a motion model is applied to predict the missing locations. After player trajectory is generated, player's orientation and speed data may be calculated according to 3D positions for all players.

Therefore, in player tracking system of the present techniques, two parts of data in the player tracking pipeline are decoupled. Specifically, the player location and player identity are decoupled in a single view-based process. The association of location and identity is then solved across multiple views. In the present framework, both location and identification data can co-optimize the tracking results. It also facilitates the model update for identity such as team classification and improves final accuracy.

At block 1202, player location, jersey, and team classification are obtained. At block 1204, it is determined if a matched player can be found. If a matched player is found, process flow continues to block 1210, where the player trajectory is updated. If a matched player is not found, process flow continues to block 1206 where a new player appearance is generated. At block 1208, a unique player ID is generated. At block 1212 all trajectories associated with the player are obtained. The trajectories may include a plurality of tracklets.

At block 1214, it is determined if the trajectory is to be updated. If the trajectory is not to be updated, process flow continues to block 1218 where forward prediction by a damping model occurs. If the trajectory is to be updated, process flow continues to block 1216 where the correct jersey or team error is determined. Throughout the trajectory update, as indicated at block 1250 all payer trajectories are optimized. At block 1222, velocity or acceleration associated with the player is determined. At block 1224, any outliers in the velocity or acceleration are determined. Note that for certain events or game play, the velocity and acceleration of a player may be subjected to motion constraints. Velocity or acceleration outside the motion constraints may be considered outliers and removed from consideration. Other errors may cause outliers as well. At block 1226, backward repairing of the trajectory occurs. Backward repairing compensates for any holes in the trajectory due to outliers or other errors. At block 1220, trajectory smoothing occurs. At block 1228, it is determined if there is a next player to optimize trajectories. If there is a next player, process flow returns to block 1214. If there is not a next player, process flow continues to block 1230 where a next frame is obtained. The method 1200 may be repeated for each frame, across a plurality of camera views.

As illustrated by the method 1200, the PTO process takes as input MCT generated tracklets with jersey/team information. Due to tracking failures, there will be more than one global player ID for the same, identical player. Thus, the tracklet of each player is usually part of complete player trajectory and is not long enough to build a path for virtual camera operation. The false bounding boxes generated in previous processes including SCT and MCA may also generate some outliers. Incorrect or unstable player locations will lead to path jittering in trajectories generation. In addition, there are also incorrect jersey number and team tag assigned to the tracklets due to failure cases in jersey and team recognition. Finally, heavy occlusion of multiple players often leads to non-continuous tracklets as the players cannot be inferred correctly in such heavy occluded case. To concatenate separated tracklets and resolve the failure cases in previous modules, the PTO module generates a smooth trajectory with high confidence for each player. It corrects false assigned jersey number/team tags, connects broken/short tracklets of the same player, and smooths the trajectory with post-processing.

The PTO processes each frame with a fixed length frame buffer and keeps all tracklets information of one player in N frames, e.g., N=30. For each player, PTO merges all the tracklets and updates the target trajectory frame by frame. The steps are described in Alg.1.

---

Algorithm 1. Player trajectory generation (PTO)

Process of trajectory generation

Frame 0, Initialize player trajectory for each player in start frame (0) -
Frame t Update player trajectory queue
(t > 0), i. For each player ID in MCT results of current frame, assign it to corresponding trajectory according to global player ID. And update the trajectory with player location $L_t$ in current frame.
ii. For the player ID not present in existing trajectories, assign it to the trajectory with the same jersey number and team tag.
iii. If both player ID and jersey number/team tag pair are not present in existing trajectories, create a new trajectory starting at location $L_t$.
- Optimize player trajectory
i. For existing trajectory not assigned locations in current frame, predict the location of this player using a motion model $$S_t = S_0 + V_0 t - \frac{\alpha y_t t^2}{2}, \text{ where } V_t = V_0 - aV_{t-1}, a > 0 \quad (6)$$

Where a is a parameter to suppress the velocity of player, $V_t$ updates current velocity and $S_t$ calculates the displacement of the player in current frame w.r.t previous frame.
ii. For existing trajectory with assigned player ID/jersey/team tag, rectify the inconsistent jersey number/team tag with voting.
iii. Remove outlier location in current frame. Outlier location is defined with velocity of player >10 m/s or acceleration >3 m/s².
iv. Fill in missing path backward in trajectory with a linear interpolation.
v. Apply smoothing for each existing trajectory.

---

In Alg.1, when occlusion is not heavy and the player's location is available in several non-contiguous frames, the outliers are deleted and the missing locations are recovered by interpolation and smoothing, as shown in step (ii) to (iv) of Algorithm 1. When the occlusion is heavy and the locations cannot be derived within consecutive frames, a motion model is applied to predict the missing locations, as illustrated in step (i). With this process, the complete trajectory of player can be obtained. The diagram of FIG. 12 is not intended to indicate that the method 1200 include all of the blocks shown in FIG. 12. Rather, the example process 1200 can be implemented using fewer or additional blocks not illustrated in FIG. 12.

Figure 13:
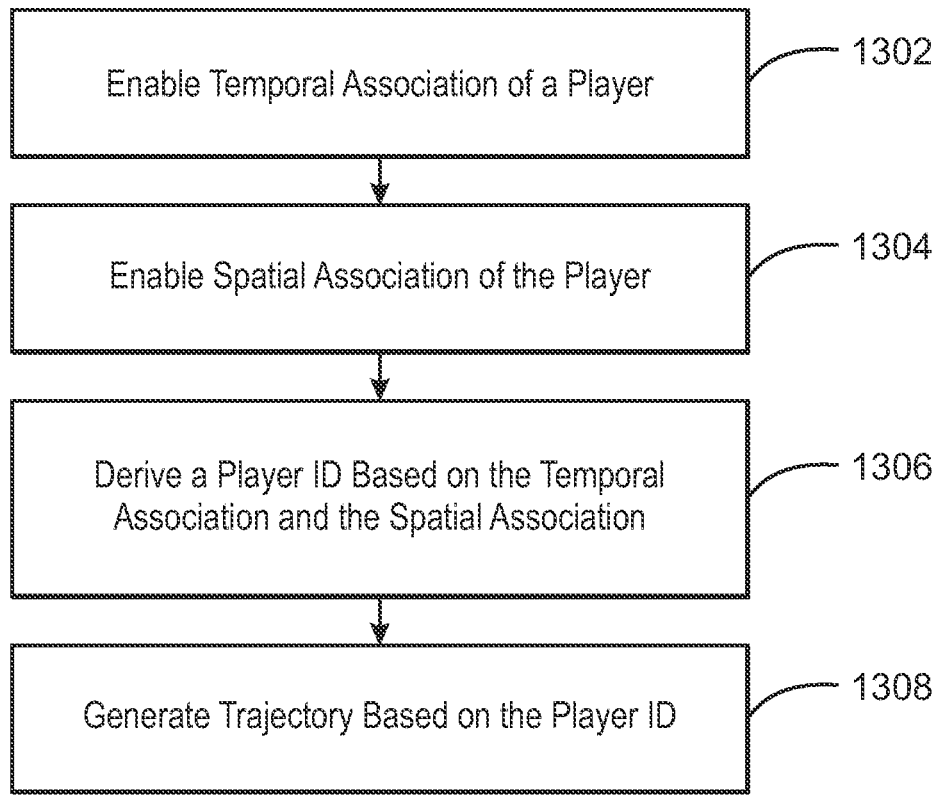
FIG. 13 is a process flow diagram of a method for player trajectory generation via multiple camera player tracking.

FIG. 13 is a process flow diagram of a method 1300 for player trajectory generation via multiple camera player tracking. At block 1302, a temporal Association of a player is enabled. At block 1304, a spatial association of the player is enabled. At block 1306, a player ID is derived based on the temporal Association in the spatial Association of the player. At block 1306, a trajectory is generated based on the player identification. Accordingly, the present techniques generate a stable and continuous trajectory for each player in team sports on the playfield, with correct jersey number and team tag. For this purpose, two processes are executed, i.e., MCT and PTO to generate desired trajectories, and the input data is from SCT, SJR, STC and MCA.

This process flow diagram is not intended to indicate that the blocks of the example process 1300 is to be executed in any particular order, or that all of the blocks are to be included in every case. Further, any number of additional blocks not shown may be included within the example process 130000, depending on the details of the specific implementation.

Conventional techniques are unable to offer a workable solution to derive trajectories and resolve problems including heavy occlusion, player deformation, similar player appearance, etc., which are quite common in American football games. For all modules in the present multiple-camera player tracking system as described herein, each has unique function and plays an indispensable role, but none of them are able to represent the whole player tracking system. Therefore, high accuracy is not attributed to one or several components of the system, but rather from orchestration of the whole tracking system. Indeed, accurate player tracking are very challenging tasks for team sports. The difficulties mainly come from heavy occlusion of players, large variation of body shape and similar appearance of player. To address these challenges, the present techniques present a multi-camera based player tracking solution which can track each player in the field of play and output its 2D and 3D trajectory during certain period in the game. Moreover, the present techniques identify players in the field of play via a unique consistent player ID. The ID includes team info (home/away team or referee) and jersey number.

By contrast, conventional solutions mostly rely on appearance Re-ID feature to distinguish and connect the same person from multi-cameras, which is error prone as players wear almost the same and very close in appearance. This is especially common in American football game. Therefore, their solutions are not amenable for sports videos. Moreover, the existing multi-camera multi-object tracking methods target multi-camera configuration with low overlapping between cameras. Further, the usage scenario only contains moderate occlusion case and few shape variations. That is, conventional solutions do not work with heavy occlusion, deformation, along with similar appearance. As a result, common issues like false detection, ID switches cannot be resolved in conventional techniques.

Additionally, the present techniques provide an optical player tracking solution under multiple-camera configuration. The whole system consists of several algorithm modules including single-cam player detection (SCD)/single-cam player tracking (SCT), single-cam player jersey recognition (SJR)/single-cam player team classification (STC)/multiple-camera association (MCA), multi-camera tracklet generation (MCT) and player tracklet optimization (PTO). Conventional techniques do not enable an optical aware player tracking work in American football.

The present techniques efficiently utilize both location and identification information to track all players in the playfield to achieve accurate tracking results. On one hand, player detection and player tracking in a single camera view provides the player location information. On the other hand, the jersey and team data can give the identification data for each player and connect the same player in the temporal domain. Both position and identification data can be used to optimize the final tracking path for all individual players. Therefore, unlike existing conventional solutions, the present techniques explicitly d-couples the whole player tracking pipeline into two micro-modules, i.e., player location and player identification module. SCD for location, SJR/STC for identification and SCT links them temporally. MCT and PTO serve as the process to fuse the data together. Both location and identification data can co-optimize the tracking results and augment final accuracy.

Moreover, the present techniques efficiently leverage multiple cameras to improve the overall tracking accuracy. First, in a multiple-camera association, all the bounding boxes for the same player across different cameras are connected to one global player in the ground plane. Second, in multiple-camera tracklet generation phase, the global tracklet ID is generated by exploiting both spatial and temporal domain (MCA and SCT). Finally, in jersey and team assignment module, the multiple-camera team/jersey results are fused and assign the right identification tag for each tracklet. With the decoupling of location and identification, a pure multi-view process to integrate the location and identification data is enabled. This multi-view process contains MCA and MCT modules, working together to sort out how to associate the locations and identities between different camera views.

In addition to providing player's location and identity information, the present techniques also provide other non-tracking information. For instance, the home and away team information can be inferred through adding the logic in the PTO process, which is non-existent in all previous methods. Furthermore, with previous decoupling of location and identities, the tracking system according to the present techniques can also adapt to the illumination/whether change through periodically updating the online team tag to ensure the model can adapt to different environments.

Further, the present techniques can run in real-time speed with a well-orchestrated module and framework design. The temporal consistency is exploited in the SCT and MCT process, which runs in serial and follows a light weight design. Other modules can be run in parallel and some of them can be offloaded to GPU instance. Given the mutual optimization in position and identification, the present techniques can effectively resolve the errors accumulated in each phase. These errors may be due to heavy shape variation and occlusion. Each stage may contain some errors, like false/miss detection, ID switch, wrong association, team/jersey detection error, etc. Finally, although American football is used to described the solutions of the present techniques, the present techniques can also be used in all multiple camera multi person tracking usage scenarios.

Figure 14:
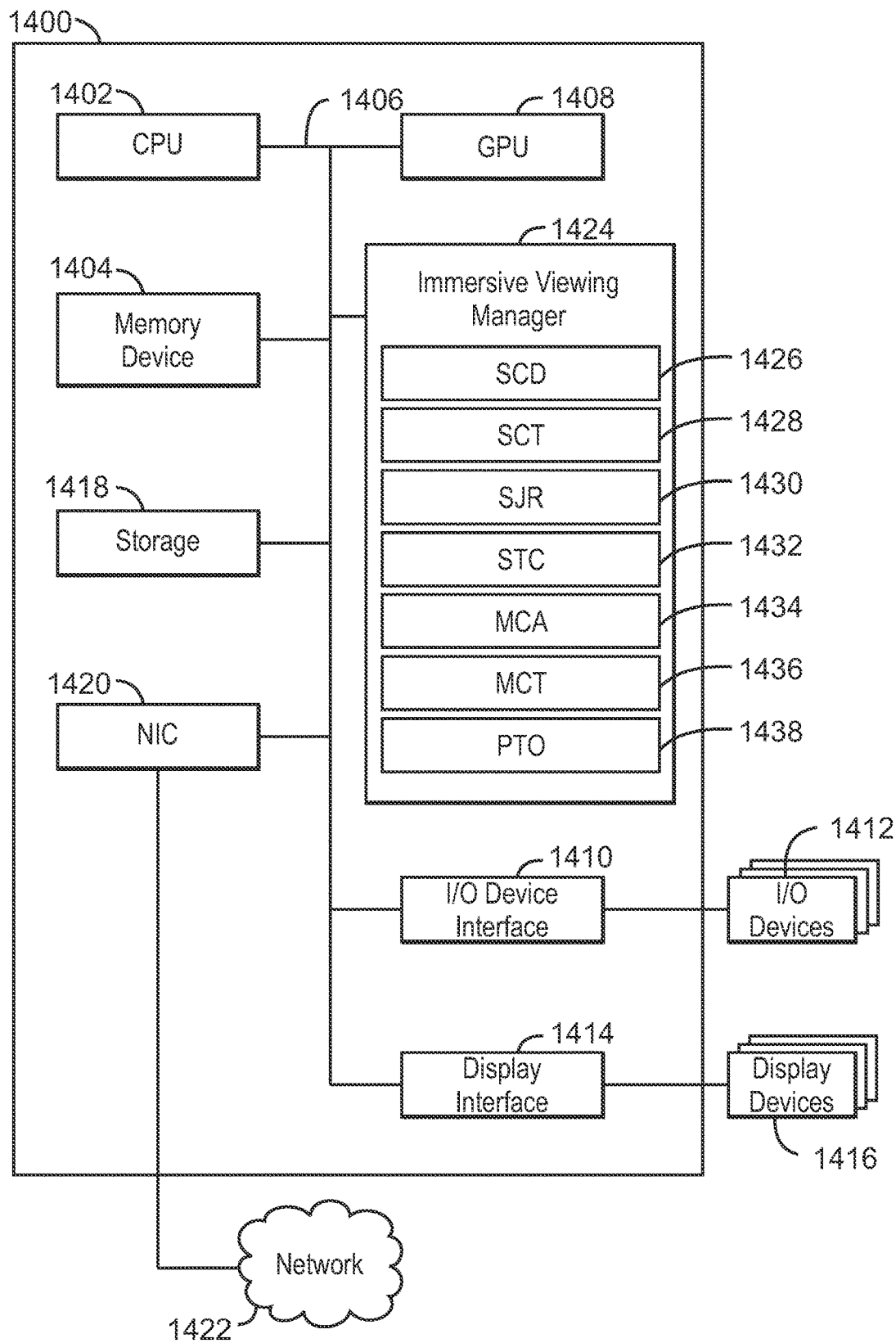
FIG. 14 is a block diagram is shown illustrating player trajectory generation via multiple camera player tracking.

Referring now to FIG. 14, a block diagram is shown illustrating player trajectory generation via multiple camera player tracking. The computing device 1400 may be, for example, a laptop computer, desktop computer, tablet computer, mobile device, or wearable device, among others. In some examples, the computing device 1400 may be a smart camera or a digital security surveillance camera. The computing device 1400 may include a central processing unit (CPU) 1402 that is configured to execute stored instructions, as well as a memory device 1404 that stores instructions that are executable by the CPU 1402. The CPU 1402 may be coupled to the memory device 1404 by a bus 1406. Additionally, the CPU 1402 can be a single core processor, a multi-core processor, a computing cluster, or any number of other configurations. Furthermore, the computing device 1400 may include more than one CPU 1402. In some examples, the CPU 1402 may be a system-on-chip (SoC) with a multi-core processor architecture. In some examples, the CPU 1402 can be a specialized digital signal processor (DSP) used for image processing. The memory device 1404 can include random access memory (RAM), read only memory (ROM), flash memory, or any other suitable memory systems. For example, the memory device 1404 may include dynamic random-access memory (DRAM).

The computing device 1400 may also include a graphics processing unit (GPU) 1408. As shown, the CPU 1402 may be coupled through the bus 1406 to the GPU 1408. The GPU 1408 may be configured to perform any number of graphics operations within the computing device 1400. For example, the GPU 1408 may be configured to render or manipulate graphics images, graphics frames, videos, or the like, to be displayed to a viewer of the computing device 1400.

The CPU 1402 may also be connected through the bus 1406 to an input/output (I/O) device interface 1410 configured to connect the computing device 1400 to one or more I/O devices 1412. The I/O devices 1412 may include, for example, a keyboard and a pointing device, wherein the pointing device may include a touchpad or a touchscreen, among others. The I/O devices 1412 may be built-in components of the computing device 1400, or may be devices that are externally connected to the computing device 1400. In some examples, the memory 1404 may be communicatively coupled to I/O devices 1412 through direct memory access (DMA).

The CPU 1402 may also be linked through the bus 1406 to a display interface 1414 configured to connect the computing device 1400 to a display device 1416. The display devices 1416 may include a display screen that is a built-in component of the computing device 1400. The display devices 1416 may also include a computer monitor, television, or projector, among others, that is internal to or externally connected to the computing device 1400. The display device 1416 may also include a head mounted display.

The computing device 1400 also includes a storage device 1418. The storage device 1418 is a physical memory such as a hard drive, an optical drive, a thumb drive, an array of drives, a solid-state drive, or any combinations thereof. The storage device 1418 may also include remote storage drives.

The computing device 1400 may also include a network interface controller (NIC) 1420. The NIC 1420 may be configured to connect the computing device 1400 through the bus 1406 to a network 1422. The network 1422 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1400 further includes an immersive viewing manager 1424. The immersive viewing manager 1424 may be configured to enable a 360° view of a sporting event from any angle. In particular images captured by a plurality of cameras may be processed such that an end user can virtually experience any location within the field of play. In particular, the end user may establish a viewpoint in the game, regardless of particular camera locations used to capture images of the sporting event. The immersive viewing manager 1424 includes an SCD module 1426 to determine isolated bounding boxes of each player in each captured camera view. An SCT module 1428 is to obtain the association of the bounding boxes of an identical player between frames in each camera view, assigning identical players a unique track ID between different frames. An SJR module 1430 is to recognize the jersey number of a player. An STC module 1432 is to recognize the team tag of a player. An MCA module 1434 uses bounding boxes of a player in one frame from each camera view to derive a 2D/3D location pf the player in the field of play. An MCT module 1436 derives correspondences and connects the temporal and spatial associations to determine a global player identification of each player in the field of play. Finally, a PTO module 1438 takes as input the jersey/team information and locations and generates player trajectories.

The block diagram of FIG. 14 is not intended to indicate that the computing device 1400 is to include all of the components shown in FIG. 14. Rather, the computing device 1400 can include fewer or additional components not illustrated in FIG. 14, such as additional buffers, additional processors, and the like. The computing device 1400 may include any number of additional components not shown in FIG. 14, depending on the details of the specific implementation. Furthermore, any of the functionalities of the immersive viewing manager 1424, SCD module 1426, SCT module 1428, SJR module 1430, STC module 1432, MCA module 1434, MCT module 1436, and PTO module 1438 may be partially, or entirely, implemented in hardware and/or in the processor 1402. For example, the functionality may be implemented with an application specific integrated circuit, in logic implemented in the processor 1402, or in any other device. For example, the functionality of the immersive viewing manager 1424 may be implemented with an application specific integrated circuit, in logic implemented in a processor, in logic implemented in a specialized graphics processing unit such as the GPU 1408, or in any other device.

Figure 15:
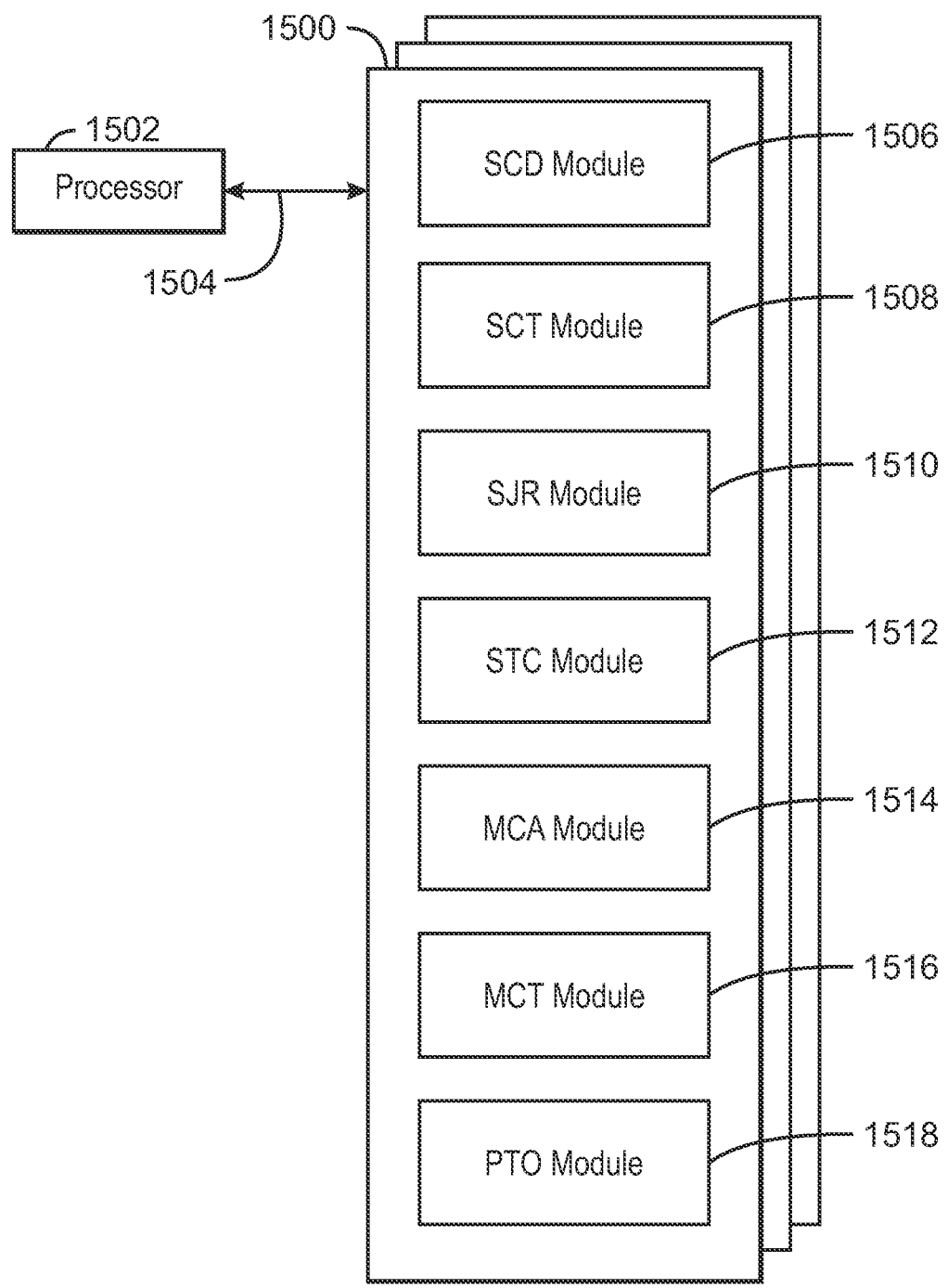
FIG. 15 is a block diagram showing computer readable media that stores code for player trajectory generation via multiple camera player tracking.

FIG. 15 is a block diagram showing computer readable media 1500 that stores code for player trajectory generation via multiple camera player tracking. The computer readable media 1500 may be accessed by a processor 1502 over a computer bus 1504. Furthermore, the computer readable medium 1500 may include code configured to direct the processor 1502 to perform the methods described herein. In some embodiments, the computer readable media 1500 may be non-transitory computer readable media. In some examples, the computer readable media 1500 may be storage media.

The various software components discussed herein may be stored on one or more computer readable media 1500, as indicated in FIG. 15. For example, an SCD module 1506 is to determine isolated bounding boxes of each player in each captured camera view. An SCT module 1508 is to obtain the association of the bounding boxes of an identical player between frames in each camera view, assigning identical players a unique track ID between different frames. An SJR module 1510 is to recognize the jersey number of a player. An STC module 1512 is to recognize the team tag of a player. An MCA module 1514 uses bounding boxes of a player in one frame from each camera view to derive a 2D/3D location pf the player in the field of play. An MCT module 1516 derives correspondences and connects the temporal and spatial associations to determine a global player identification of each player in the field of play. Finally, a PTO module 1518 takes as input the jersey/team information and locations and generates player trajectories.

The block diagram of FIG. 15 is not intended to indicate that the computer readable media 1500 is to include all of the components shown in FIG. 15. Further, the computer readable media 1500 may include any number of additional components not shown in FIG. 15, depending on the details of the specific implementation.

EXAMPLES

Example 1 is a method for trajectory generation based on player tracking. The method includes determining a spatial association for a player a captured field of view; determining a temporal association for the player in the captured field of view; deriving a global player identification based on the temporal association and the spatial association; and generating a trajectory based on the global player identification.

Example 2 includes the method of example 1, including or excluding optional features. In this example, the temporal association is found by determining a bounding box including the first player in multiple frames of a same camera view of the captured field of view.

Example 3 includes the method of any one of examples 1 to 2, including or excluding optional features. In this example, the spatial association is found by determining a player location across a plurality of camera views at a particular timestamp.

Example 4 includes the method of any one of examples 1 to 3, including or excluding optional features. In this example, short tracklets are generated based on the global player ID, and the trajectory is generated by concatenating a plurality of short tracklets for the first player.

Example 5 includes the method of any one of examples 1 to 4, including or excluding optional features. In this example, short tracklets are generated based on the global player ID, and the trajectory is generated by concatenating a plurality of short tracklets using a jersey number of the first player and a team tag of the first player and eliminate outliers are eliminated by a motion constraint.

Example 6 includes the method of any one of examples 1 to 5, including or excluding optional features. In this example, the method includes applying global smoothing to the generated trajectory.

Example 7 includes the method of any one of examples 1 to 6, including or excluding optional features. In this example, the method includes constructing a virtual camera within a three-dimensional volumetric representation of the captured field of view, and progressing through the three-dimensional volumetric representation according to the generated trajectory.

Example 8 includes the method of any one of examples 1 to 7, including or excluding optional features. In this example, the method includes deriving the spatial association at a frame-level to associate a plurality of players from each camera view and compute a three-dimensional position for each player using projective matrices.

Example 9 includes the method of any one of examples 1 to 8, including or excluding optional features. In this example, the method includes assigning the global player ID a jersey number and a team tag.

Example 10 includes the method of any one of examples 1 to 9, including or excluding optional features. In this example, in response to an indication of partial or total occlusion of the first player according to a distance matrix, allocate a new global player identification for the first player.

Example 11 is a system for trajectory generation based on player tracking. The system includes a single camera player tracking (SCT) module to determine a temporal association for a first player in a captured field of view; a multiple camera association (MCA) module to determine a spatial association for the first player; a multiple camera tracking (MCT) module to derive a global player identification based on the temporal association and the spatial association; and a player trajectory optimization (PTO) module to generate a trajectory based on the global player identification.

Example 12 includes the system of example 11, including or excluding optional features. In this example, the temporal association is found by determining a bounding box including the first player in multiple frames of a same camera view of the captured field of view.

Example 13 includes the system of any one of examples 11 to 12, including or excluding optional features. In this example, the spatial association is found by determining a player location across a plurality of camera views at a particular timestamp.

Example 14 includes the system of any one of examples 11 to 13, including or excluding optional features. In this example, short tracklets are generated based on the global player ID, and the trajectory is generated by concatenating a plurality of short tracklets for the first player.

Example 15 includes the system of any one of examples 11 to 14, including or excluding optional features. In this example, short tracklets are generated based on the global player ID, and the trajectory is generated by concatenating a plurality of short tracklets using a jersey number of the first player and a team tag of the first player and eliminate outliers are eliminated by a motion constraint.

Example 16 includes the system of any one of examples 11 to 15, including or excluding optional features. In this example, the system includes applying global smoothing to the generated trajectory.

Example 17 includes the system of any one of examples 11 to 16, including or excluding optional features. In this example, the system includes constructing a virtual camera within a three-dimensional volumetric representation of the captured field of view, and progressing through the three-dimensional volumetric representation according to the generated trajectory.

Example 18 includes the system of any one of examples 11 to 17, including or excluding optional features. In this example, the system includes deriving the spatial association at a frame-level to associate a plurality of players from each camera view and compute a three-dimensional position for each player using projective matrices.

Example 19 includes the system of any one of examples 11 to 18, including or excluding optional features. In this example, the system includes assigning the global player ID a jersey number and a team tag.

Example 20 includes the system of any one of examples 11 to 19, including or excluding optional features. In this example, in response to an indication of partial or total occlusion of the first player according to a distance matrix, allocate a new global player identification for the first player.

Example 21 is at least one non-transitory computer-readable medium. The computer-readable medium includes instructions that direct the processor to determine a spatial association for a player a captured field of view; determine a temporal association for the player in the captured field of view; derive a global player identification based on the temporal association and the spatial association; and generate a trajectory based on the global player identification.

Example 22 includes the computer-readable medium of example 21, including or excluding optional features. In this example, the temporal association is found by determining a bounding box including the first player in multiple frames of a same camera view of the captured field of view.

Example 23 includes the computer-readable medium of any one of examples 21 to 22, including or excluding optional features. In this example, the spatial association is found by determining a player location across a plurality of camera views at a particular timestamp.

Example 24 includes the computer-readable medium of any one of examples 21 to 23, including or excluding optional features. In this example, short tracklets are generated based on the global player ID, and the trajectory is generated by concatenating a plurality of short tracklets for the first player.

Example 25 includes the computer-readable medium of any one of examples 21 to 24, including or excluding optional features. In this example, short tracklets are generated based on the global player ID, and the trajectory is generated by concatenating a plurality of short tracklets using a jersey number of the first player and a team tag of the first player and eliminate outliers are eliminated by a motion constraint.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for trajectory generation based on player tracking, comprising:
    determining a spatial association for a player in a captured field of view;
    determining a temporal association for the player in the captured field of view;
    deriving a global player identification (ID) based on the temporal association and the spatial association, the global player ID associated with a jersey number of the player; and
    generating a trajectory based on the global player ID.

2. The method of claim 1, wherein the temporal association is found by determining a bounding box including the player in multiple frames of a same camera view of the captured field of view.

3. The method of claim 1, wherein the spatial association is found by determining a player location across a plurality of camera views at a particular timestamp.

4. The method of claim 1, wherein short tracklets are generated based on the global player ID, and the trajectory is generated by concatenating a plurality of short tracklets for the player.

5. The method of claim 1, wherein short tracklets are generated based on the global player ID, and the trajectory is generated by concatenating a plurality of the short tracklets using the jersey number of the player and a team tag of the player and eliminating outliers by a motion constraint.

6. The method of claim 1, further including applying global smoothing to the generated trajectory.

7. The method of claim 1, further including constructing a virtual camera within a three-dimensional volumetric representation of the captured field of view, and progressing through the three-dimensional volumetric representation according to the generated trajectory.

8. The method of claim 1, further including deriving the spatial association at a frame-level to associate a plurality of players from each camera view and computing a three-dimensional position for each player using projective matrices.

9. The method of claim 1, further including assigning the global player ID the jersey number and a team tag.

10. The method of claim 1, further including, in response to an indication of partial or total occlusion of the player according to a distance matrix, allocating a new global player ID for the player.

11. A system for trajectory generation based on player tracking, comprising:
    a single camera player tracking (SCT) module to determine a temporal association for a first player in a captured field of view;
    a multiple camera association (MCA) module to determine a spatial association for the first player;
    a multiple camera tracking (MCT) module to derive a global player identification (ID) based on the temporal association and the spatial association, the global player ID associated with a jersey number of the first player; and
    a player trajectory optimization (PTO) module to generate a trajectory based on the global player ID.

12. The system of claim 11, wherein the temporal association is found by determining a bounding box including the first player in multiple frames of a same camera view of the captured field of view.

13. The system of claim 11, wherein the spatial association is found by determining a player location across a plurality of camera views at a particular timestamp.

14. The system of claim 11, wherein short tracklets are generated based on the global player ID, and the trajectory is generated by concatenating a plurality of the short tracklets for the first player.

15. The system of claim 11, wherein short tracklets are generated based on the global player ID, and the trajectory is generated by concatenating a plurality of the short tracklets using the jersey number of the first player and a team tag of the first player and eliminating outliers by a motion constraint.

16. The system of claim 11, wherein the PTO module is to apply global smoothing to the generated trajectory.

17. The system of claim 11, further including an immersive viewing manager to construct a virtual camera within a three-dimensional volumetric representation of the captured field of view, and progress through the three-dimensional volumetric representation according to the generated trajectory.

18. The system of claim 11, wherein the MCA module is to derive the spatial association at a frame-level to associate a plurality of players from each camera view and compute a three-dimensional position for each player using projective matrices.

19. The system of claim 11, wherein the MCT module is to assign the global player ID the jersey number and a team tag.

20. The system of claim 11, wherein in response to an indication of partial or total occlusion of the first player according to a distance matrix, the MCT module is to allocate a new global player ID for the first player.

21. At least one non-transitory computer-readable medium, comprising instructions to direct a processor to:
    determine a spatial association for a player a captured field of view;
    determine a temporal association for the player in the captured field of view;
    derive a global player identification (ID) based on the temporal association and the spatial association, the global player ID associated with a jersey number of the player; and
    generate a trajectory based on the global player ID.

22. The non-transitory computer readable medium of claim 21, wherein the temporal association is found by determining a bounding box including the player in multiple frames of a same camera view of the captured field of view.

23. The non-transitory computer readable medium of claim 21, wherein the spatial association is found by determining a player location across a plurality of camera views at a particular timestamp.

24. The non-transitory computer readable medium of claim 21, wherein short tracklets are generated based on the global player ID, and the trajectory is generated by concatenating a plurality of the short tracklets for the player.

25. The non-transitory computer readable medium of claim 21, wherein short tracklets are generated based on the global player ID, and the trajectory is generated by concatenating a plurality of the short tracklets using the jersey number of the player and a team tag of the player and outliers are eliminated by a motion constraint.

\* \* \* \* \*